(12) United States Patent
Meager

(10) Patent No.: US 12,370,881 B1
(45) Date of Patent: Jul. 29, 2025

(54) WHEEL FOR USE IN A LOW GRAVITY VEHICLE

(71) Applicant: AZAK Inc., Driggs, ID (US)

(72) Inventor: Benjamin Meager, Felt, ID (US)

(73) Assignee: AZAK Inc., Driggs, ID (US)

( * ) Notice: Subject to any disclaimer, the term of this patent is extended or adjusted under 35 U.S.C. 154(b) by 715 days.

(21) Appl. No.: 17/493,610

(22) Filed: Oct. 4, 2021

Related U.S. Application Data

(60) Provisional application No. 63/087,672, filed on Oct. 5, 2020.

(51) Int. Cl.
| | | |
|---|---|---|
| *B60K 7/00* | (2006.01) | |
| *B60B 27/00* | (2006.01) | |
| *B60K 1/04* | (2019.01) | |
| *B60K 17/04* | (2006.01) | |
| *B60B 7/00* | (2006.01) | |

(52) U.S. Cl.
CPC ........ *B60K 7/0007* (2013.01); *B60B 27/0031* (2013.01); *B60K 1/04* (2013.01); *B60K 17/043* (2013.01); *B60B 7/0066* (2013.01); *B60B 2360/32* (2013.01)

(58) Field of Classification Search
CPC ................ B60K 7/0007; B60K 17/043; B60K 2007/0061; B60K 2007/0038; B60B 27/0031
See application file for complete search history.

(56) References Cited

U.S. PATENT DOCUMENTS

| | | |
|---|---|---|
| 1,357,571 A | 11/1920 | Knepper |
| 1,905,345 A | 4/1933 | Dandini |
| 1,915,886 A | 6/1933 | Gutierrez |
| 2,977,714 A | 4/1961 | Gibson |
| 3,016,967 A | 1/1962 | Rehfeld |
| 3,400,286 A | 9/1968 | Anastasio |
| 3,661,212 A | 5/1972 | Johnson |
| 3,667,156 A | 6/1972 | Tomiyama et al. |
| 3,905,323 A | 9/1975 | Kacere |
| 3,987,915 A | 10/1976 | Conner |
| 4,096,919 A | 6/1978 | Thompson |
| 4,102,542 A | 7/1978 | Pirre, Jr. et al. |
| 4,501,569 A | 2/1985 | Clark, Jr. et al. |
| 4,726,800 A | 2/1988 | Kobayashi |
| 4,841,632 A | 6/1989 | Namiki et al. |

(Continued)

FOREIGN PATENT DOCUMENTS

| | | |
|---|---|---|
| CN | 203496596 | 3/2014 |
| DE | 19634195 | 1/1998 |

(Continued)

OTHER PUBLICATIONS

"Servomotor," Wikipedia, last modified Dec. 2015, 5 pages [retrieved Jan. 21, 2016 from: en.wikipedia.org/wiki/Servomotor.

*Primary Examiner* — Jeffrey J Restifo
(74) *Attorney, Agent, or Firm* — Sheridan Ross P.C.

(57) ABSTRACT

Vehicles are disclosed which have a lower center of gravity than existing all-terrain, amphibious, and unmanned ground vehicles due to the location of propulsion units and other vehicle components inside the wheels of the vehicle. The vehicles can climb over large obstacles yet are also able to corner at high speeds. The vehicles can be configured for direct manual operation or operation by remote control, and can also be configured for a wide variety of missions.

20 Claims, 23 Drawing Sheets

(56) References Cited

U.S. PATENT DOCUMENTS

| | | | |
|---|---|---|---|
| 5,163,494 A | 11/1992 | MacNeil et al. | |
| 5,427,193 A | 6/1995 | Avakian | |
| 5,755,304 A | 5/1998 | Trigg et al. | |
| 5,878,829 A | 3/1999 | Kanno et al. | |
| 6,302,494 B1 | 10/2001 | DiMarco et al. | |
| 6,328,123 B1 * | 12/2001 | Niemann | B60T 1/065 |
| | | | 180/65.6 |
| 6,585,490 B1 | 7/2003 | Gabrys et al. | |
| 7,011,171 B1 | 3/2006 | Poulter | |
| 7,198,280 B2 * | 4/2007 | Hara | A63C 17/0033 |
| | | | 280/87.01 |
| 7,494,398 B2 | 2/2009 | Laurienzo | |
| 7,659,680 B1 | 2/2010 | McVickers | |
| 8,701,801 B2 | 4/2014 | Itou et al. | |
| 8,807,254 B2 * | 8/2014 | Manus | B60K 17/043 |
| | | | 301/6.5 |
| 9,457,647 B2 * | 10/2016 | Meager | B60K 7/0007 |
| 9,616,318 B2 * | 4/2017 | Rogers | B60K 7/0007 |
| 9,660,500 B2 * | 5/2017 | Huang | B62K 9/00 |
| 9,919,200 B2 * | 3/2018 | Mo | H02K 7/08 |
| 9,950,243 B2 * | 4/2018 | Evans | B62D 65/02 |
| 9,950,703 B2 | 4/2018 | Lee et al. | |
| 10,065,693 B2 * | 9/2018 | Meager | B60K 7/0007 |
| 10,179,508 B2 | 1/2019 | Meager | |
| 10,543,874 B2 | 1/2020 | Meager | |
| 10,807,659 B2 * | 10/2020 | Pikulski | B62J 25/04 |
| 10,814,211 B2 * | 10/2020 | Pikulski | A63C 17/12 |
| 11,040,747 B2 | 6/2021 | Meager | |
| 11,583,754 B2 * | 2/2023 | Pikulski | A63C 17/12 |
| 11,648,458 B2 * | 5/2023 | Rogers | B60L 50/51 |
| | | | 180/181 |
| 11,975,794 B2 * | 5/2024 | Huang | B62K 15/00 |
| 12,054,210 B2 * | 8/2024 | Meager | B62D 63/02 |
| 2002/0011368 A1 | 1/2002 | Van Den Berg | |
| 2002/0170685 A1 | 11/2002 | Weik, III et al. | |
| 2003/0010551 A1 | 1/2003 | Shirazawa | |
| 2003/0213630 A1 | 11/2003 | Pyntikov et al. | |
| 2004/0092206 A1 | 5/2004 | Lynders et al. | |
| 2004/0210356 A1 | 10/2004 | Wilton et al. | |
| 2005/0007553 A1 | 1/2005 | Romanoff et al. | |
| 2005/0023052 A1 | 2/2005 | Beck et al. | |
| 2005/0067207 A1 | 3/2005 | Radtke et al. | |
| 2007/0194640 A1 | 8/2007 | Saur et al. | |
| 2007/0199748 A1 | 8/2007 | Ross, VII et al. | |
| 2007/0256747 A1 | 11/2007 | Morris | |
| 2009/0032321 A1 | 2/2009 | Marsh et al. | |
| 2010/0139995 A1 | 6/2010 | Rudakevych | |
| 2010/0163323 A1 * | 7/2010 | Pickholz | B60K 7/0007 |
| | | | 310/67 R |
| 2011/0048830 A1 | 3/2011 | Radtke et al. | |
| 2011/0106339 A1 | 5/2011 | Phillips et al. | |
| 2011/0251935 A1 | 10/2011 | German et al. | |
| 2012/0068664 A1 | 3/2012 | Franzen et al. | |
| 2012/0302390 A1 | 11/2012 | Lemire-Elmore et al. | |
| 2013/0049498 A1 | 2/2013 | Boughtwood | |
| 2013/0153311 A1 | 6/2013 | Huntzinger | |
| 2014/0341329 A1 | 11/2014 | Goder et al. | |
| 2017/0008580 A1 | 1/2017 | Meager | |
| 2017/0025922 A1 | 1/2017 | Jian et al. | |
| 2017/0259675 A1 | 9/2017 | Gaffoglio et al. | |
| 2017/0274886 A1 | 9/2017 | Kreh et al. | |
| 2018/0013338 A1 | 1/2018 | Gassman | |
| 2018/0022208 A1 | 1/2018 | Calleija et al. | |
| 2018/0297654 A1 | 10/2018 | Meager | |
| 2019/0173399 A1 | 6/2019 | Lin et al. | |
| 2019/0225268 A1 | 7/2019 | Lavoie et al. | |
| 2019/0233035 A1 | 8/2019 | Meager | |
| 2019/0255701 A1 | 8/2019 | Blankespoor et al. | |
| 2020/0001698 A1 | 1/2020 | Jang et al. | |
| 2020/0108659 A1 | 4/2020 | Downey et al. | |
| 2020/0177054 A1 * | 6/2020 | Van Seventer | H02K 9/00 |
| 2021/0023934 A1 | 1/2021 | Gillett | |
| 2021/0197903 A1 | 7/2021 | Meager | |
| 2021/0276644 A1 | 9/2021 | Meager | |
| 2022/0069667 A1 | 3/2022 | Liao | |
| 2022/0203758 A1 | 6/2022 | Meager | |
| 2022/0258532 A1 | 8/2022 | Meager | |
| 2023/0046120 A1 | 2/2023 | Meager | |
| 2023/0091087 A1 | 3/2023 | Park | |
| 2023/0331295 A1 | 10/2023 | Meager | |
| 2024/0017606 A1 * | 1/2024 | Park | B60K 7/0007 |
| 2024/0051640 A1 * | 2/2024 | Chen | B62K 11/007 |
| 2024/0092159 A1 * | 3/2024 | Cao | H02K 7/116 |
| 2024/0227537 A1 * | 7/2024 | Tsunogawa | B60G 7/02 |

FOREIGN PATENT DOCUMENTS

| | | |
|---|---|---|
| DE | 102019202849 | 9/2020 |
| DE | 102020207312 | 12/2021 |
| KR | 10-1004957 | 12/2010 |
| WO | WO 98/19875 | 5/1998 |
| WO | WO 01/28796 | 4/2001 |
| WO | WO 2010/077300 | 7/2010 |
| WO | WO 2016/119022 | 8/2016 |

* cited by examiner

WHEEL FOR USE IN A LOW GRAVITY VEHICLE

CROSS-REFERENCE TO RELATED APPLICATIONS

The present application claims the benefit of U.S. Provisional Patent Application No. 63/087,672, filed on Oct. 5, 2020, which is incorporated herein by reference in its entirety.

FIELD

The present disclosure relates generally to the field of ground and amphibious vehicles. More specifically, it relates to lowering the center of gravity of ground and amphibious vehicles, regardless of whether they are remotely operated, computer controlled or direct driven vehicles.

BACKGROUND

Known surface vehicles are useful and valuable to this day, but are limited in their use due to their inability to corner and travel at high speeds. As an example, a High Mobility Multipurpose Wheeled Vehicle commonly known as the Humvee, or a high clearance demonstration vehicle such as the Monster Truck, can climb over very large objects. However, both vehicles have the undesired tendency to flip over when cornering too quickly or when climbing an object that is too steep. This undesired effect is primarily caused by having the majority of each vehicle's weight, and therefore its center of gravity, well above the wheels. In contrast, an advanced race car, such as a Formula One race car, has its center of gravity close to the ground. As a result, it has the ability to corner at very high speeds. The body of a Formula One race car, however, is also very close to the ground. This prevents it from climbing over objects of even the smallest size, making it a ground vehicle that is ideal for high speed cornering, but not acceptable for climbing over objects as required by all-terrain vehicles.

The solution for combining both of these benefits is utilized in vehicles disclosed herein to great effect. Embodiments of the vehicles disclosed herein are capable of both cornering at high speeds and climbing large objects. The vehicles have this capability due to a dramatically lower center of gravity relative to traditional vehicles and in some cases, because they utilize very large wheels.

Prior art vehicles have been created with a low center of gravity and a single large wheel, but the use of only one wheel in these designs has created yet another dramatic limitation. When attempting to accelerate at high speeds or climb large objects, these single-wheel vehicles are susceptible to the motorized portion of their interior spinning off-axis, thus preventing the vehicle from operating at all. With a vehicle that has only one wheel, the axis or axle of the vehicle is not fixed on a plane. Gravity and weight alone keep the power unit from free-spinning inside the wheel. Due to this limitation, over-accelerating the vehicle can allow the insides of the vehicle to spin off-axis, such that the wheel and vehicle remain stationary while the insides of the vehicle spin. Embodiments of vehicles disclosed herein solve this problem by using more than one wheel to keep the axis and axles in-plane, thus allowing for rapid acceleration, high speed cornering and the ability to climb large objects.

SUMMARY

Embodiments of vehicles disclosed herein are designed for moving and cornering at high speeds as well as being able to climb large objects. Such vehicles also have the unique ability to prevent high centering, a problem common to most vehicles, including all-terrain vehicles. In some embodiments, the vehicles can move across the top of water like a boat (amphibious vehicle). As disclosed herein, these benefits are accomplished by moving the majority of the vehicle weight (e.g., engines, motors, batteries, cooling systems, electronics, communication modules, etc.) below the level of the axle and even by moving some—or in some embodiments, almost all—vehicle components into the inside of the wheels themselves. By using more than one wheel, where the wheels do not all share the same axis, embodiments of the vehicles disclosed herein are capable of more rapid acceleration than was achieved by prior art vehicles using motors placed inside a single wheel.

Though embodiments of the vehicles disclosed herein are very difficult to flip over due to their low center of gravity and high clearance, the vehicles do not have a top or a bottom, or a front or a back. This makes the vehicles capable of flipping over and continuing on their path. It also allows for increased maneuverability, due to the fact that the controls can be reversed. By simply adjusting the individual speeds of the motors or engines in each wheel (like a tank), embodiments of the vehicles disclosed herein are capable of steering without the need for additional external moving parts. This allows the vehicles disclosed herein to be robust.

The present disclosure has benefits for all types of vehicles. Embodiments of the vehicles disclosed herein are suitable for a wide variety of applications, including but not limited to: full size tanks for military action, robots capable of climbing stairs at high speeds, amphibious remotely operated vehicles (ROVs) capable of high speed water and land operations, remote control toys, unmanned vehicles that are capable of carrying large supplies and weapons to a battlefield, and even off-road race vehicles.

In addition to disclosing improved vehicles, embodiments of the present disclosure also contemplate wheel configurations for use in any type of vehicle. The disclosed wheels may be configured for easy replacement. As such, a wheel may be provided with a number of components therein that are self-contained within the environment of the wheel. Self-containment of the vehicle components within the wheel allows for quick and easy replacement of vehicle components by way of replacing a wheel. Moreover, due to the weight of such components, the center of gravity of the vehicle can be lowered if the components are positioned below a rotational axis of the wheel.

In accordance with at least one embodiment, a wheel for a vehicle is provided that generally includes:
  a wheel core configured to be physically mounted to the vehicle, where the wheel core includes:
  a rotation point that establishes an axis of rotation for the wheel;
  a core body having a center of mass positioned below the axis of rotation;
  a motor that, in response to control signals, causes the wheel to rotate about the axis of rotation and to rotate about the wheel core; and
  a cavity provided in the core body that is configured to receive the motor and position the motor below the axis of rotation.

In some embodiments, the wheel further includes a physical mount that fixedly attaches the wheel core to the frame and that prohibits motion of the wheel core relative to the frame while the wheel core is attached thereto.

In some embodiments, the wheel further includes a battery provided in the cavity of the wheel core, where the battery provides power to the motor and wherein the battery is positioned below the axis of rotation.

In some embodiments, the wheel core includes an access panel that is removably attachable to the core body and that provides access to the cavity when removed from the core body. The access panel may seal the cavity when attached to the core body. In one example, the motor is integrated into the access panel such that removal of the access panel from the wheel core causes the motor to be removed from the cavity. In one example, the access panel includes one or more gears that couple the motor with a hub and wherein the hub coincides with the rotation point.

In some embodiments, the wheel further includes a motor controller provided in the cavity of the wheel core. The wheel core may include an electrical interface that provides communication capabilities between a component mounted in a frame of the vehicle and the motor controller. As one example, the electrical interface includes a wired electrical interface.

In some embodiments, the wheel further includes an antenna to facilitate wireless communications between the motor controller and another control device.

In some embodiments, the wheel core is made of molded plastic.

According to still another embodiment of the present disclosure, a self-contained motorized wheel comprises an axle extending through an inner volume of the self-contained wheel and having one end positioned outside of the inner volume; a propulsion unit drivingly coupled to the wheel; and a frame mount positioned within the inner volume and connected to the axle, the frame mount having a portion extending below an axis of the axle, which portion supports a control unit, a receiver, and a plurality of energy sources for powering the propulsion unit, control unit, and the receiver. The receiver receives wireless signals for controlling propulsion unit via the control unit, and the center of gravity of the wheel is below an axis of rotation of the wheel.

The propulsion unit may be a hub motor mounted around the axle. Alternatively, the propulsion unit may be a motor mounted above or below the axle. The plurality of energy sources may be a plurality of batteries, and the plurality of batteries may have more mass than the propulsion unit. The one end of the axle may be attached to a frame.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. Various changes may be made in the function and arrangement of elements without departing from the spirit and scope of the appended claims.

Various examples are provided throughout the following disclosure. The disclosure of examples is in all cases intended to be non-limiting, including specifically when examples are identified with the terms or phrases identifying what follows to be an example, including the terms of phrases "for example," "as one example," "such as," "by way of example," and "e.g." In other words, the disclosure of one or more examples is not intended to limit the present disclosure to embodiments conforming to the disclosed example(s).

Embodiments of vehicles disclosed herein may include any number of features. While various examples of vehicles will be described with particular features, it should be appreciated that the features depicted and described in connection with a particular vehicle may be used in another vehicle without departing from the scope of the present disclosure. Moreover, embodiments of a wheel or wheel core described in connection with a particular vehicle configuration may be used in any other vehicle configuration without departing from the scope of the present disclosure. Further still, embodiments of the present disclosure contemplate that vehicle wheels or wheel cores may be easily replaced by other wheels or wheel cores. Thus, embodiments of the present disclosure contemplate that wheels of one type or wheel cores of one type may be used to replace wheels of another type or wheel cores of another type.

Referring now to FIGS. 1-16, a first illustrative vehicle 100 and components thereof will be described in accordance with at least some embodiments of the present disclosure. The vehicle 100 is shown to include a frame 104 and a number of wheels 108 connected to the frame 104. In the illustrated embodiment, at least one of the wheels 108 is configured to rotate around an axis of rotation that is parallel to, but not overlapping with an axis of rotation of another wheel 108. Specifically, the front wheels 108 may rotate about a first axis of rotation while the back wheels 108 may rotate about a second axis of rotation.

The frame 104 may be configured to receive the wheels 108 and have the wheels 108 mounted thereto. The frame 104 may provide a mechanical support for the wheels 108 and may include one or more components that facilitate communications between wheels 108, that contribute to control capabilities of the wheels 108, that provide power between wheels 108, and/or that support other functions of the vehicle 100.

Figure 1:
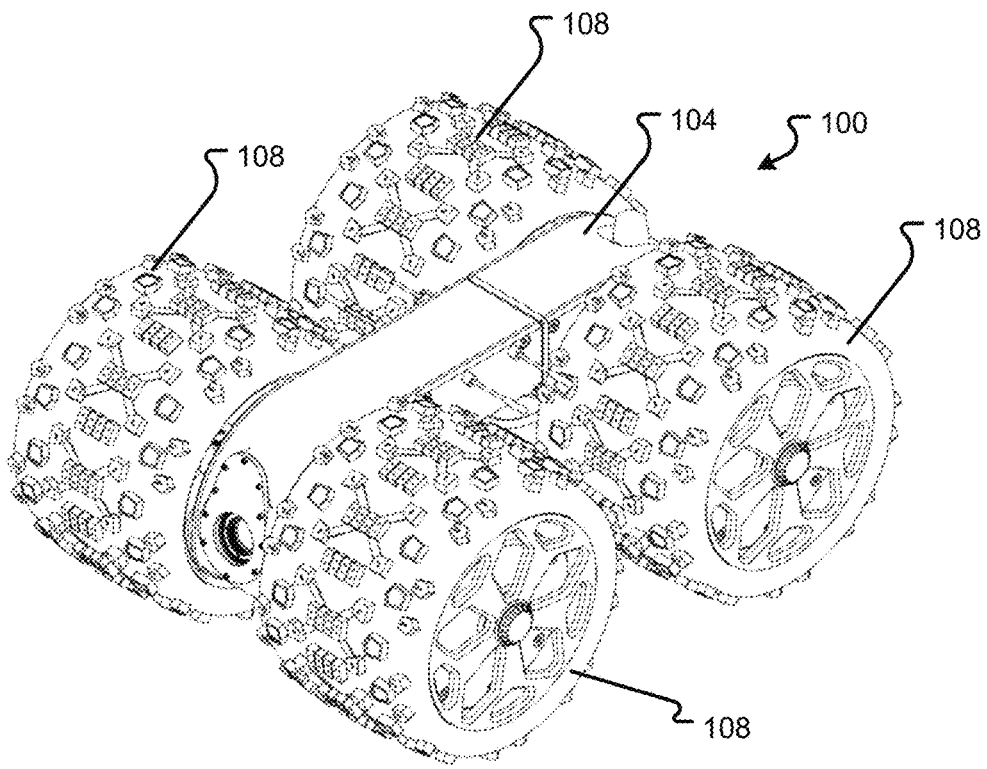
FIG. 1 is an isometric view of a vehicle according to embodiments of the present disclosure.
Figure 2:
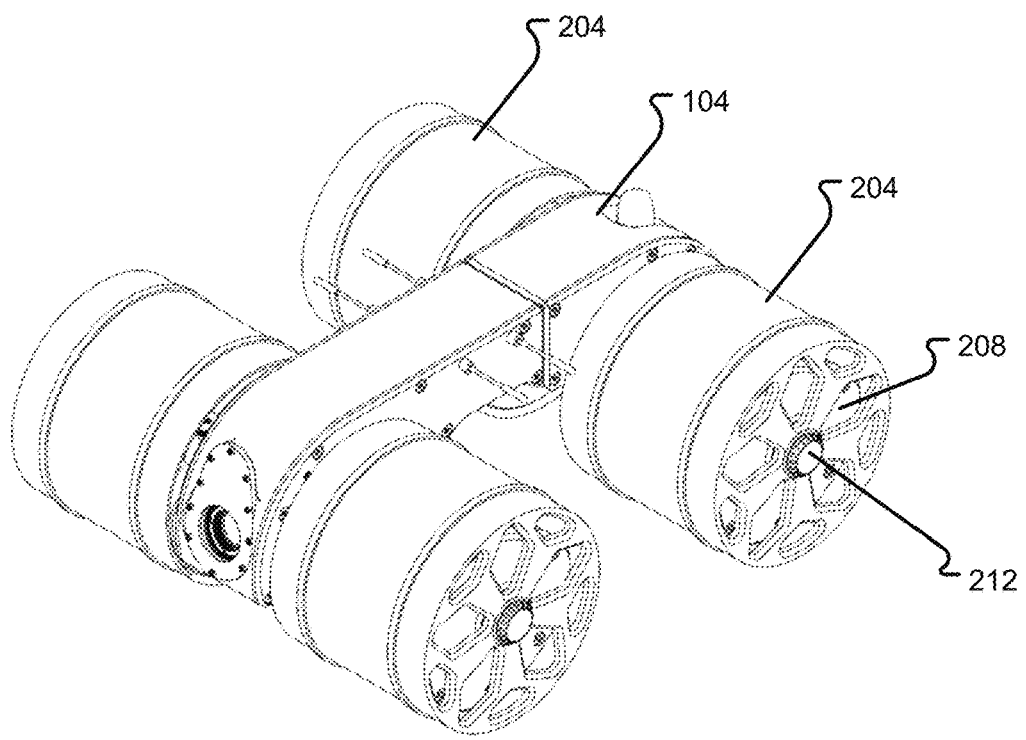
FIG. 2 is another isometric view of the vehicle shown in FIG. 1.

As shown in FIG. 2, a wheel 108 may include a tire that is mounted onto/supported by a rim 204. The rim 204 may be configured to rotate about a fixed wheel portion 208 around a rotation point 212. The axis of rotation may pass through the rotation point 212 and the rotation point 212 may correspond to a center of a wheel bearing or the like. In some embodiments, the fixed wheel portion 208 may be mounted to the frame 104 while the rim 204 rotates about bearings or the like. In other words, the fixed wheel portion 208 may not substantially rotate relative to the frame 104. Instead, the fixed wheel portion 208 may be configured to provide a rotation point 212 about which the rim 204 and tire of the wheel 108 rotate.

Figure 3:
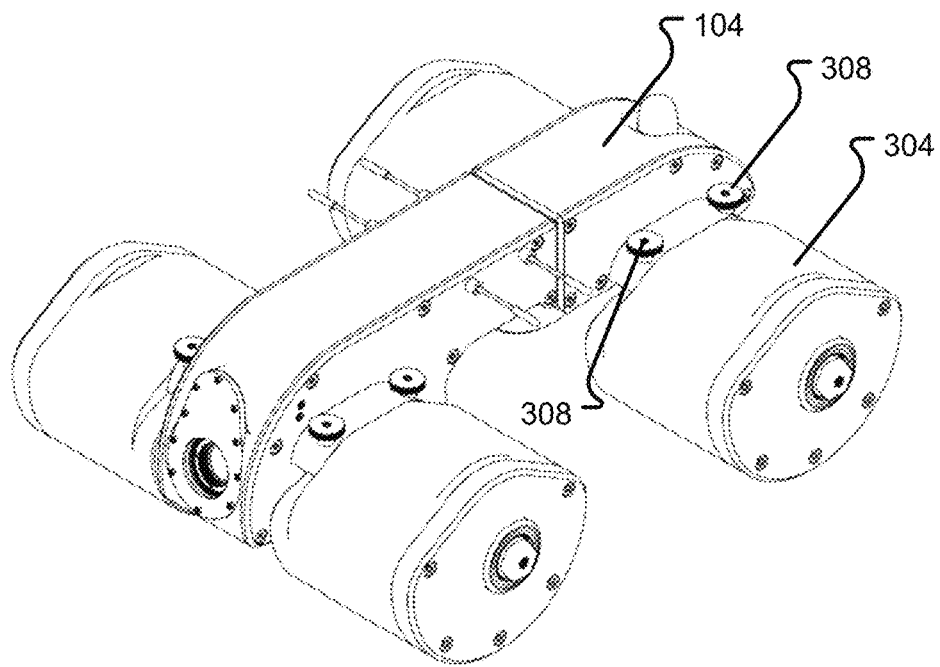
FIG. 3 is another isometric view of the vehicle shown in FIG. 1.
Figure 4:
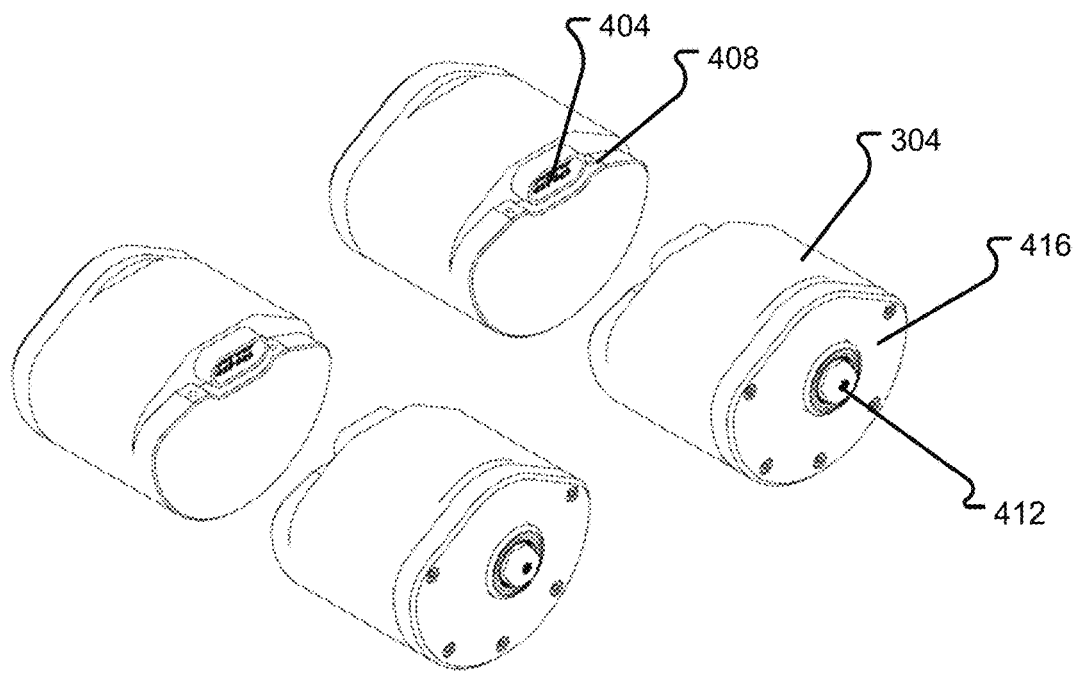
FIG. 4 is an isometric view of components of a vehicle according to embodiments of the present disclosure.
Figure 5:
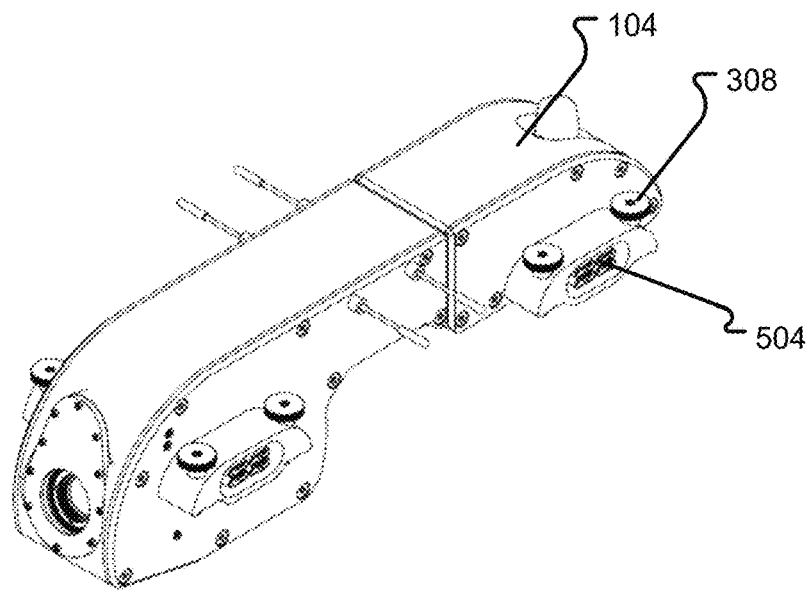
FIG. 5 is an isometric view of a vehicle frame according to embodiments of the present disclosure.
Figure 6:
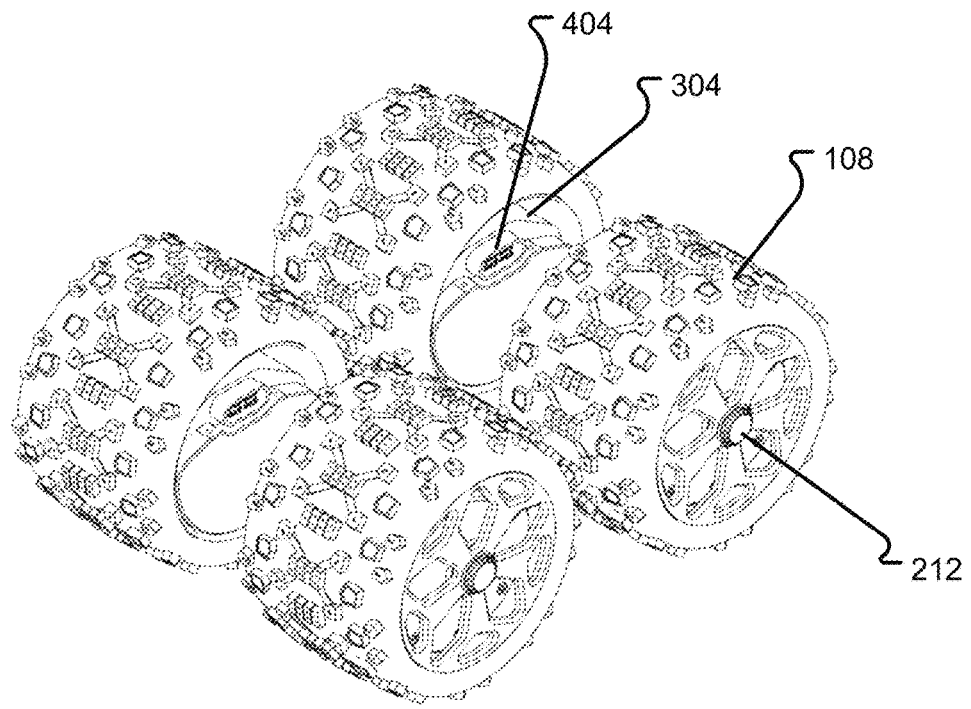
FIG. 6 is an isometric view of wheels according to embodiments of the present disclosure.
Figure 7A:
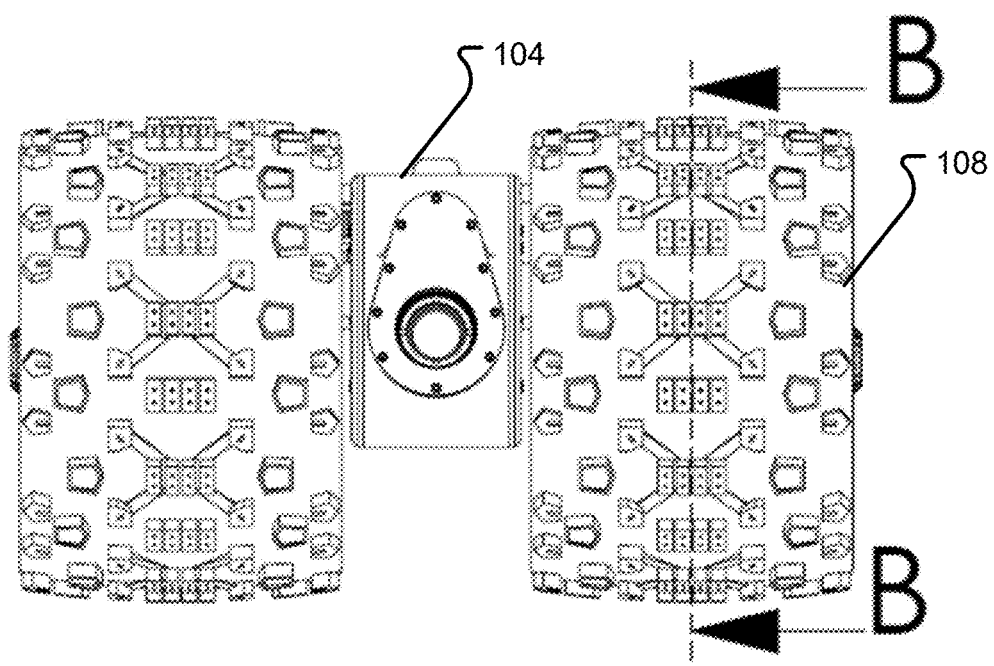
FIG. 7A is a front view of the vehicle shown in FIG. 1.
Figure 7B:
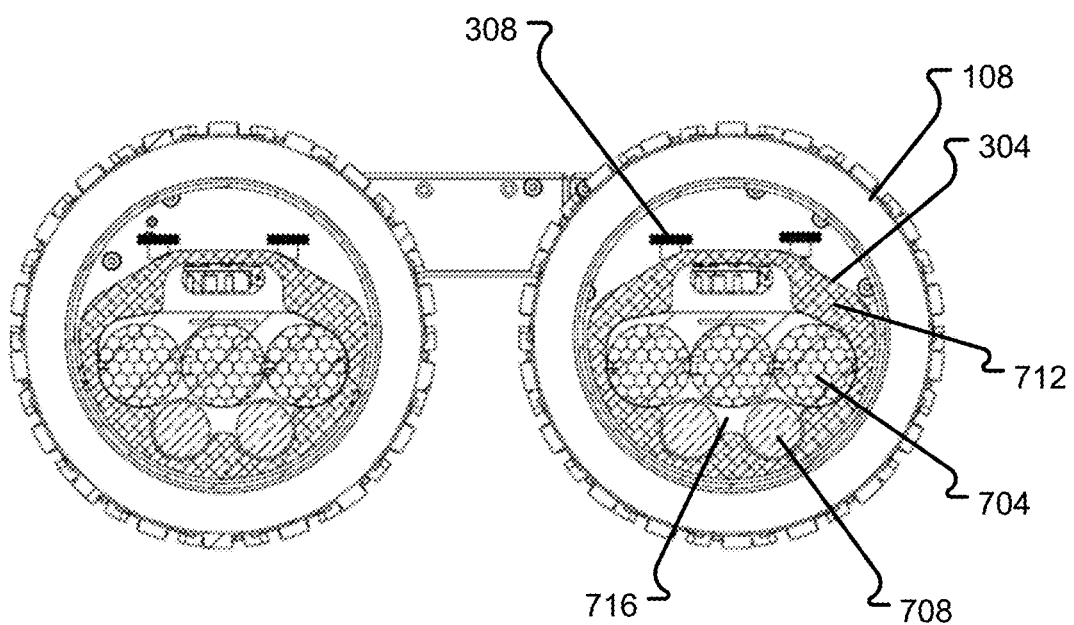
FIG. 7B is a cross-sectional view along line B-B.
Figure 8A:
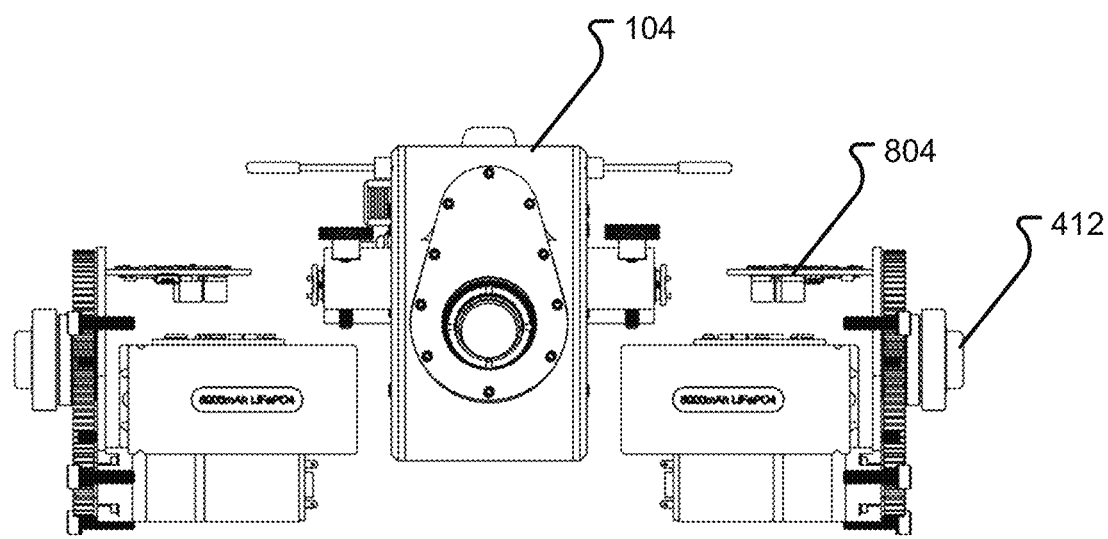
FIG. 8A is a front exploded view of vehicle components according to embodiments of the present disclosure.
Figure 8B:
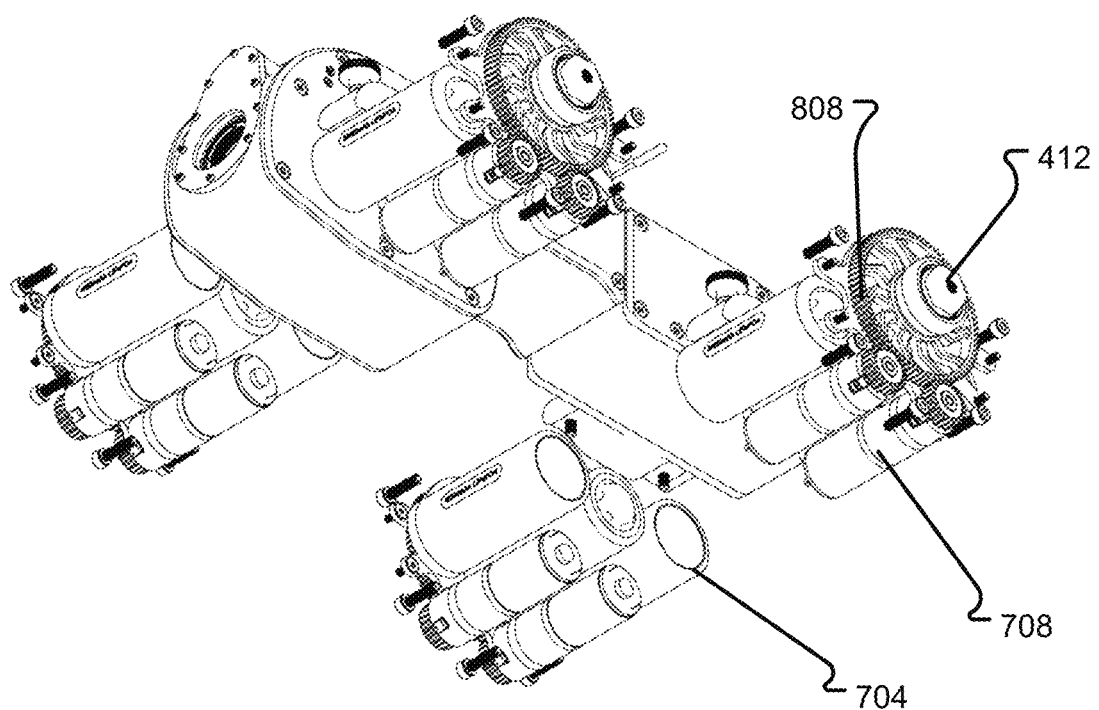
FIG. 8B is a bottom isometric view of the components depicted in FIG. 8A.

FIGS. 3 and 4 illustrate an example fixed wheel portion 208 in the form of a wheel core 304. The wheel core 304 may include a physical mount 408 and an electrical interface 404. The physical mount 408 of the wheel core 304 may physically contact the frame 104 at a mount point where core mount screws 308 may be used to secure/fix the wheel core 304 to the frame 104. In some embodiments, the physical mount 408 corresponds to a physical platform that interfaces with a counterpart platform on the frame 104. The core mount screws 308 may be provided to secure the physical connection between the wheel core 304 and frame 104. While depicted as screws, it should be appreciated that any type of suitable connection mechanism (e.g., snap fitting, bolt, rivet, friction fit, etc.) may be used to secure the physical connection between the wheel core 304 and frame 104.

In addition to the physical interface between the wheel core 304 and frame 104, there may also be an electrical interface between the wheel core 304 and frame 104. In some embodiments, the electrical interface 404 may include a wired electrical interface 404 that provides a pin and receptacle arrangement. The electrical interface 404 may alternatively or additionally include a wireless interface (e.g., one or more antennas, antenna drivers, and processors/firmware) that enable wireless communications between components of a wheel 108 and components of a frame 104. A wired electrical interface 404 may be useful in some situations as the wired electrical interface 404 may provide additional structural stability for the physical connection between the frame 104 and wheel 108. The electrical interface 404, in some embodiments, is configured to support a quick and easy replacement of one wheel core 304 (or one wheel 108) with another wheel core 304 (or another wheel 108). The electrical interface 404 may connect with and/or be received at a core interface 504 provided on the frame 104. The core interface 504 may include complimentary electrical connectors (e.g., pins or receptacles as appropriate) for interfacing with the electrical interface 404 of the wheel core 304. In some embodiments, the core interface 504 and electrical interface 404 exchange control signals, power, state signals, or other electrical current between a wheel 108 and the frame 104. The signals exchanged between the core interface 504 and electrical interface 404 may include analog and/or digital signals. Moreover, one or both interfaces 404, 504 may include one or more signal amplifiers, digital-to-analog converters, analog-to-digital converters, and other circuitry that enables an exchange of electrical signals.

The wheel core 304 is also shown to include an access panel 416 and hub 412. The access panel 416 may provide an additional mechanism for accessing and/or replacing components of the wheel core 304 without necessarily having to remove the wheel core 304 from the frame 104 on which it is mounted. In other words, as shown in FIGS. 4-16, the access panel 416 may be removably attached to a core body 712. Removal of the access panel 416 may provide access to components mounted within the core body 712. The core body 712 may have a cavity 716 that is exposed when the access panel 416 is removed/detached from the core body 712. In some embodiments, the cavity 716 may be configured to receive and house wheel components such as batteries 704, motor(s) 708, a motor controller 804, sensors, cooling elements, and the like.

The shape of the wheel core 304 is configured to provide a center of gravity below the rotation point 212. More specifically, the wheel core 304 may be configured to provide some or all of the cavity 716 beneath the axis of rotation of the wheel 108, which coincides with the rotation point 212. In some embodiments, a hub 412 of the wheel core 304 is positioned at an upper extremity of the cavity 716 and the center of the hub 412 may correspond to the rotation point 212. The hub 412 may also correspond to a center of the wheel 108 even though the hub 412 is not positioned at a center of the wheel core 304. In some embodiments, the hub 412 may be mechanically coupled to the motor(s) 708 of the wheel core 304 by one or more gears 808. In the depicted but non-limiting embodiment, each wheel core 304 includes a pair of motors 708, both of which are coupled to the hub 412 by one or more gears 808. In some embodiments, one motor 708 may be used to rotate the wheel 108 in one direction (e.g., move the vehicle 100 forward) whereas the other motor 708 may be used to rotate the wheel 108 in the opposite direction (e.g., move the vehicle backward), but such a configuration is not required.

The motors 708 may receive their power from the battery (ies) 704 and may be controlled based on control signals received from the controller 804. The controller 804 of a wheel 108 may be communicating with a centralized controller in the frame 104 or may receive control signals from a wireless remote control device. In the former configuration, the controller 804 may receive control signals either wirelessly or via a wired communication that passes through the electrical interface 404. In the later configuration, the controller 804 may be connected with a wireless interface/receiver that is also mounted within the wheel core 304. In a configuration where the controller 804 receives wireless control signals directly from a remote control device, each wheel 108 may operate independently based upon the appropriate control signal received at each controller 804 of each wheel 108.

Figure 14:
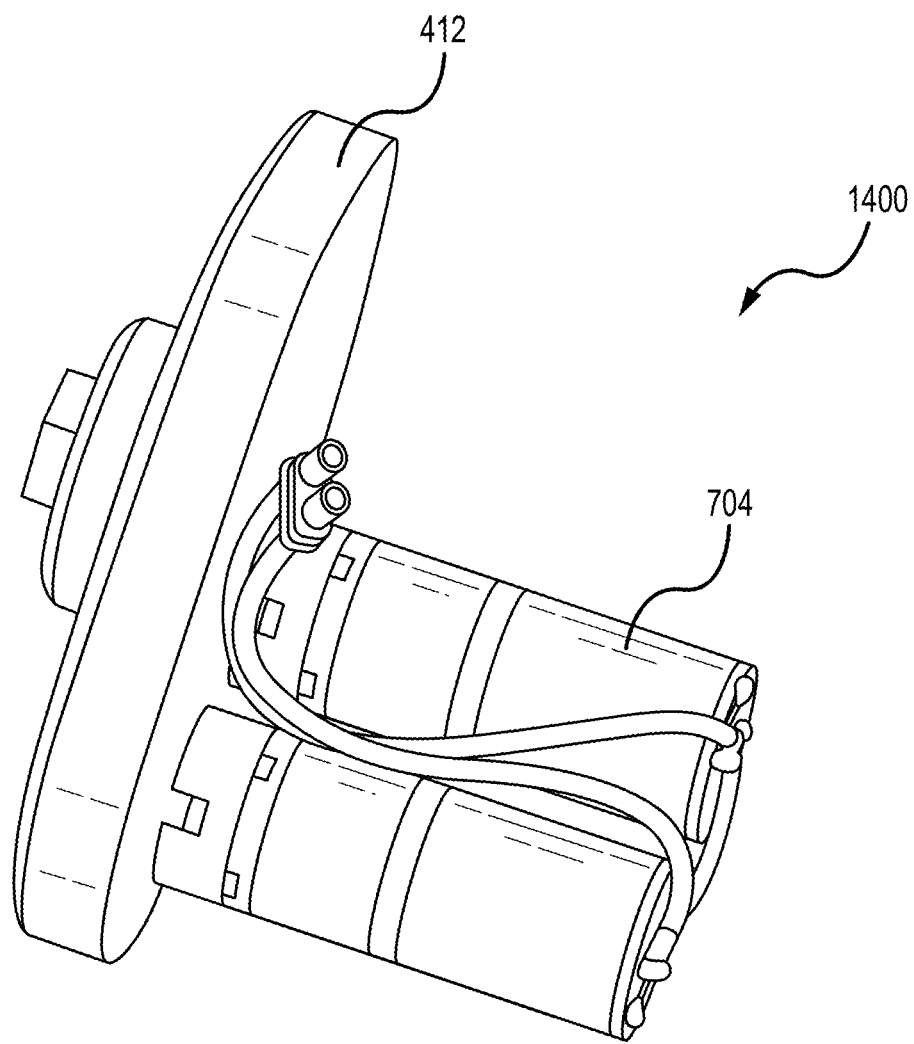
FIG. 14 is an isometric view of a core insert according to embodiments of the present disclosure.
Figure 15:
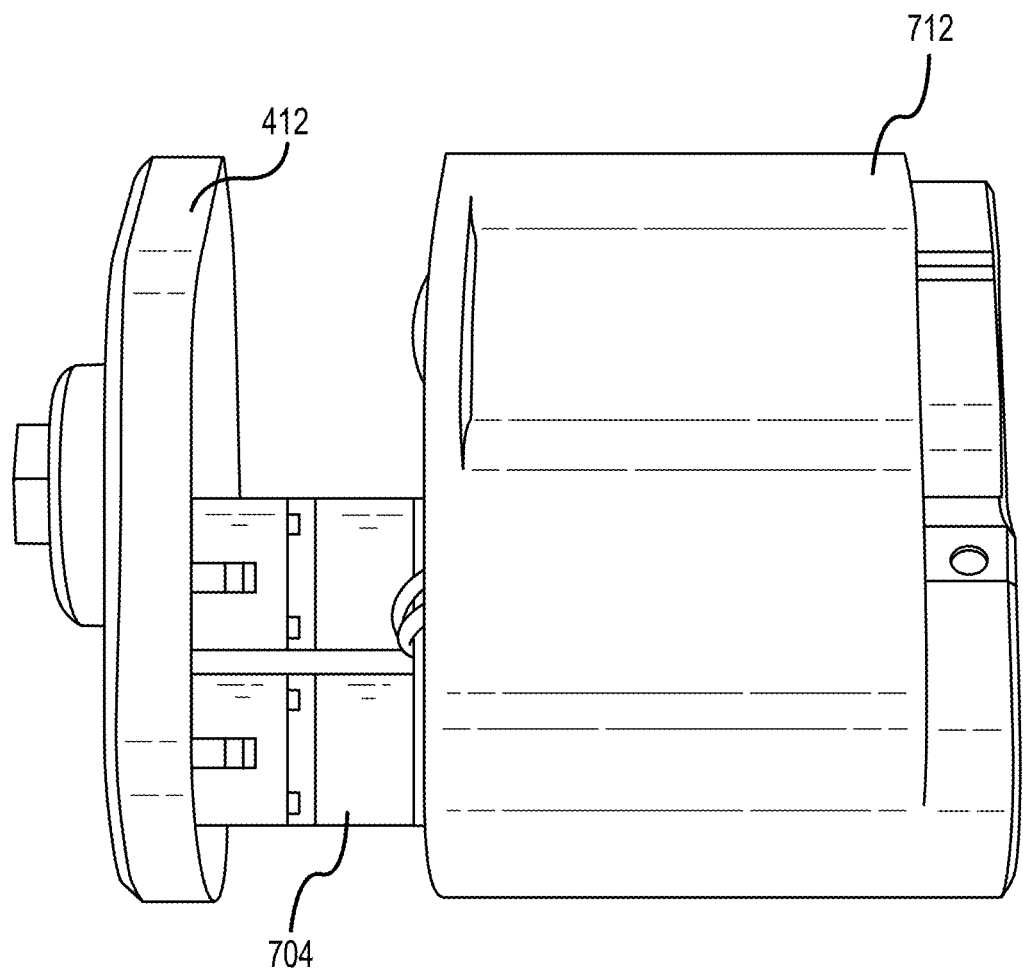
FIG. 15 is an isometric view of a core according to embodiments of the present disclosure.
Figure 16:
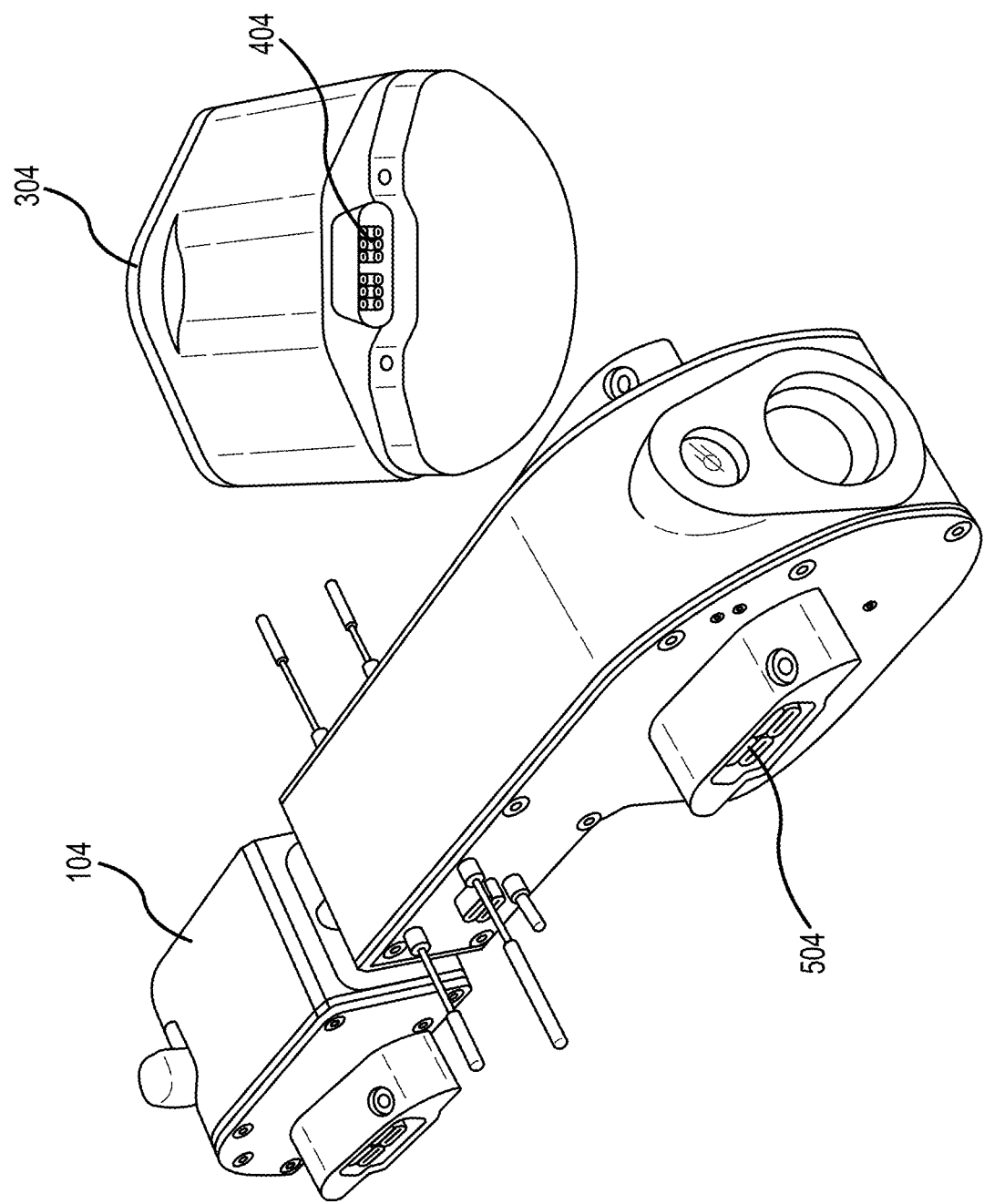
FIG. 16 is another isometric view of vehicle components according to embodiments of the present disclosure.
Figure 17:
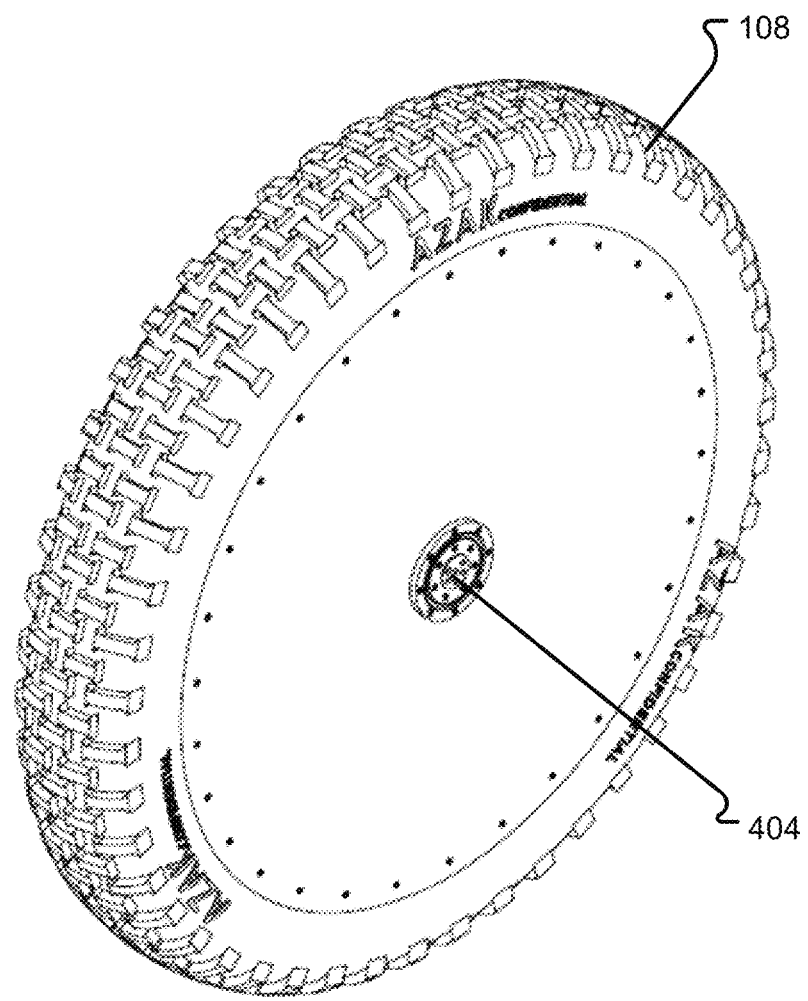
FIG. 17 is an isometric view of another wheel according to embodiments of the present disclosure.
Figure 18:
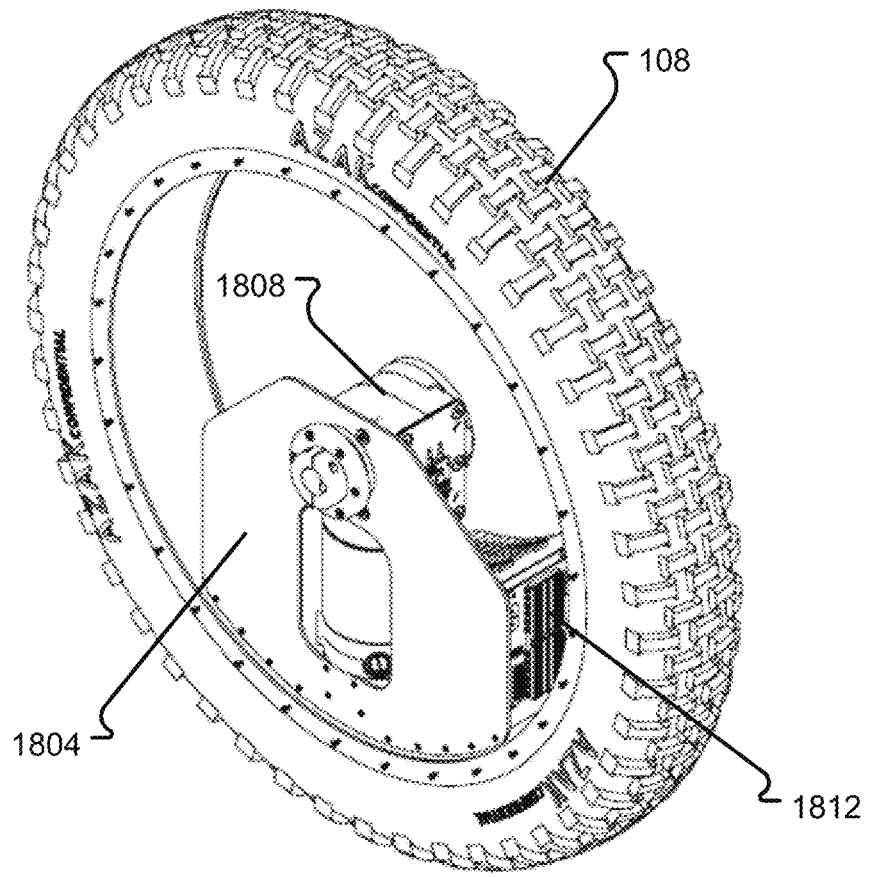
FIG. 18 is an isometric view of an inside of the wheel depicted in FIG. 17.
Figure 19:
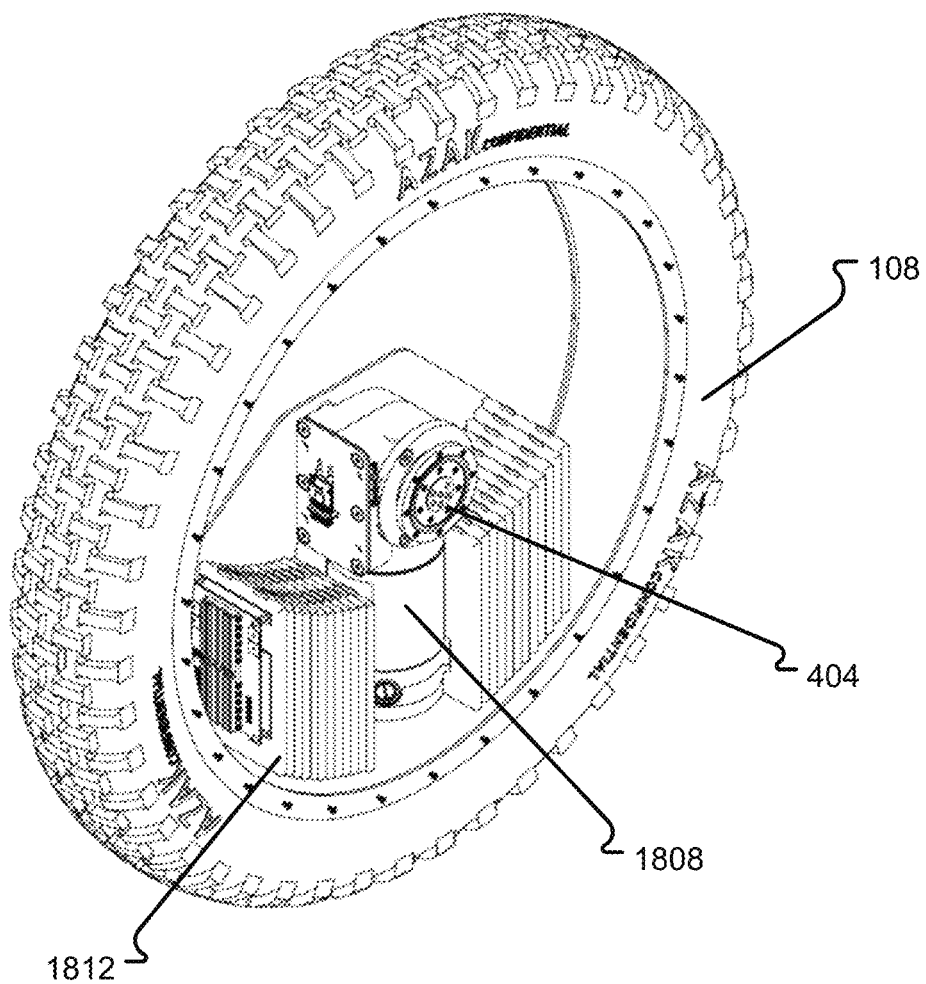
FIG. 19 is an alternative isometric view of the wheel depicted in FIG. 17.
Figure 20A:
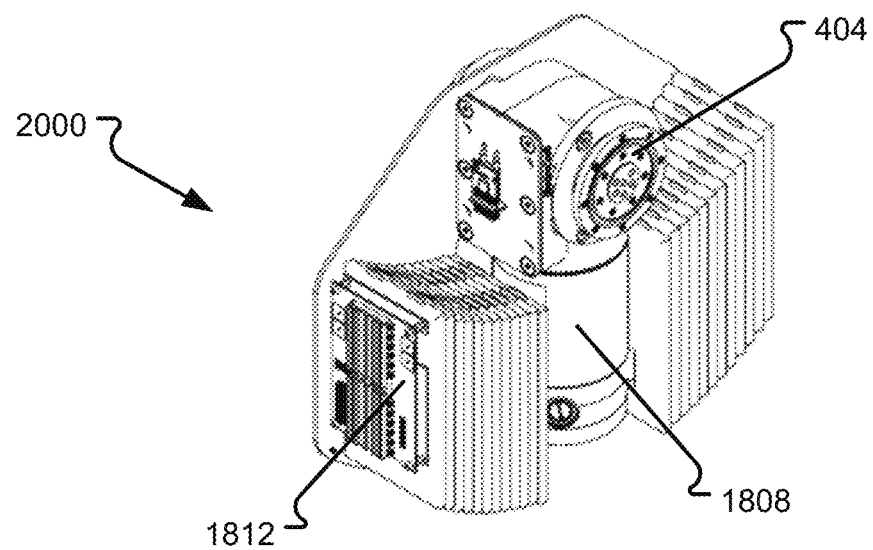
FIG. 20A is an isometric view of a wheel core according to embodiments of the present disclosure.
Figure 20B:
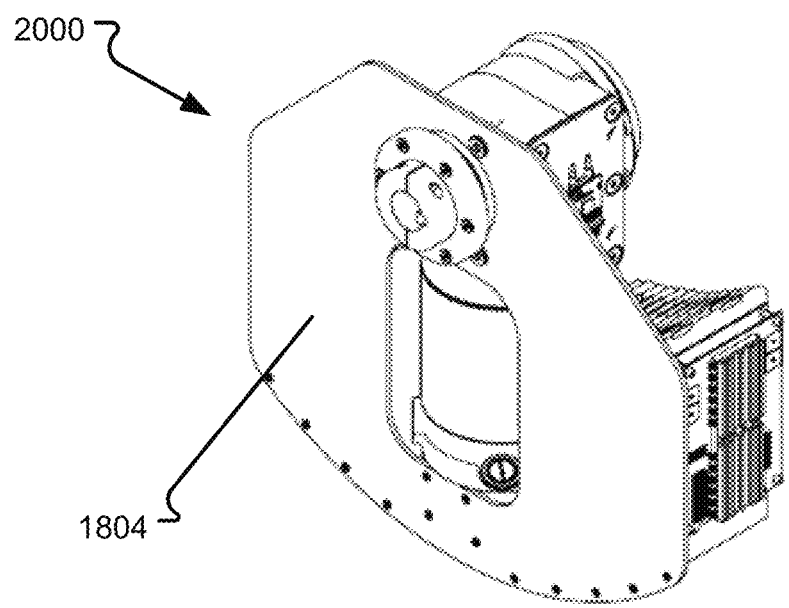
FIG. 20B is an alternative isometric view of the wheel core depicted in FIG. 20A.
Figure 21:
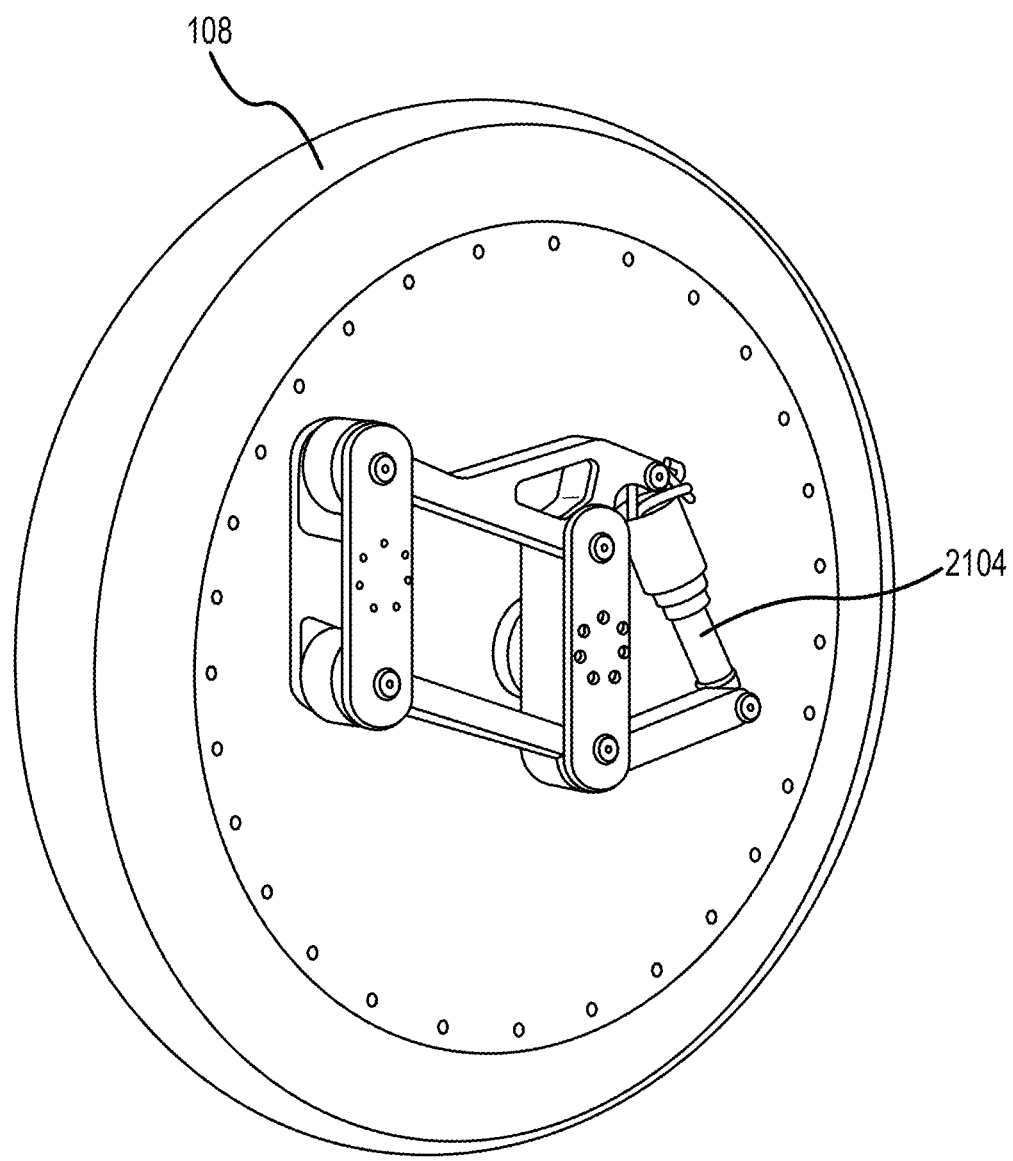
FIG. 21 is an isometric view of a wheel according to embodiments of the present disclosure.

The access panel 416 may be configured to support a number of different functions within the wheel core 304. In some embodiments, the access panel 416 may correspond to a removable panel that is releasably connectable to the core body 712. The removable nature of the access panel 416 may enable relatively easy replacement/maintenance of components housed within the core body 712 without requiring the removal of the core body 412, wheel core 304, or wheel 108 from the frame 108. Instead, components of the wheel 108 can be accessed from the outwardly facing portion of the wheel core 304. Another function offered by the access panel 416 is that the access panel 416 may seal components of the wheel core 304 inside the cavity 716, thereby protecting such components from adverse environmental conditions (e.g., wind, moisture, dust, debris, etc.). Another function offered by the access panel 416 is that the access panel 412 may have the gears 808 and hub integrated therein. As shown in FIGS. 14 and 15, the access panel 416 may correspond to a removable component of the wheel core 304 that is insertable into the core body 712. In some embodiments, the access panel 416 in combination with the gears 808 and motors 708 may be referred to as a core insert 1400. By integrating multiple components into the access panel 416, replacement of a broken core insert 1400 is relatively easy and straight-forward. The core insert 1400 may correspond to a self-contained set of components that receive power from batteries 704, then impart motion/rotation on the wheel 108 by operation of the motors 708. In some embodiments, the core insert 1400 may include all of the moving components of the wheel core 304. If one of the moving components fails, breaks, or otherwise needs replacement, the access panel 412 can be removed and replaced with another access panel 412 having new/replacement moving components. The ease with which the access panel 412 can be replaced enables relatively easy replacement of movable wheel 108 components (e.g., components which are most likely to fail) in the field.

The wheel core 304 is shown as being flush with and/or inset from an inner-most surface of the wheel 108. It should be appreciated, however, that the wheel core 304 extend beyond an inner-most surface of the wheel 108, meaning that the width of the wheel core 304 may be greater than a width of the wheel 108. Is some embodiments, the wheel core 304 may be inset from the inner-most surface of the wheel 108, meaning that the width of the wheel core 304 is less than a width of the wheel 108. In some embodiments, the wheel core 304 may be flush with or inset from an outer-most surface of the wheel 108. In some embodiments, the wheel core 304 may extend beyond the outer-most surface of the wheel 108.

In some embodiments, the wheel core 304 may be sealed within the inner cavity of the wheel 108. In some embodiments, certain components of the wheel core 304 may be sealed while other components (e.g., non-moving components like a battery) may be unsealed, but still included as part of the wheel core 304. Providing a sealed wheel core 304 may protect components thereof from unwanted debris, moisture, dust, and other foreign objects.

As shown in the various figures, the wheel core 304 may be provided in a number of non-spherical shapes. Different examples of a wheel core and possible shapes thereof are shown. Illustratively, but without limitation, the wheel core 304 may include a cylindrical body, a semi-cylindrical body, or any other elongate shape that is configured to fit within a rotatable wheel 108.

Figure 9:
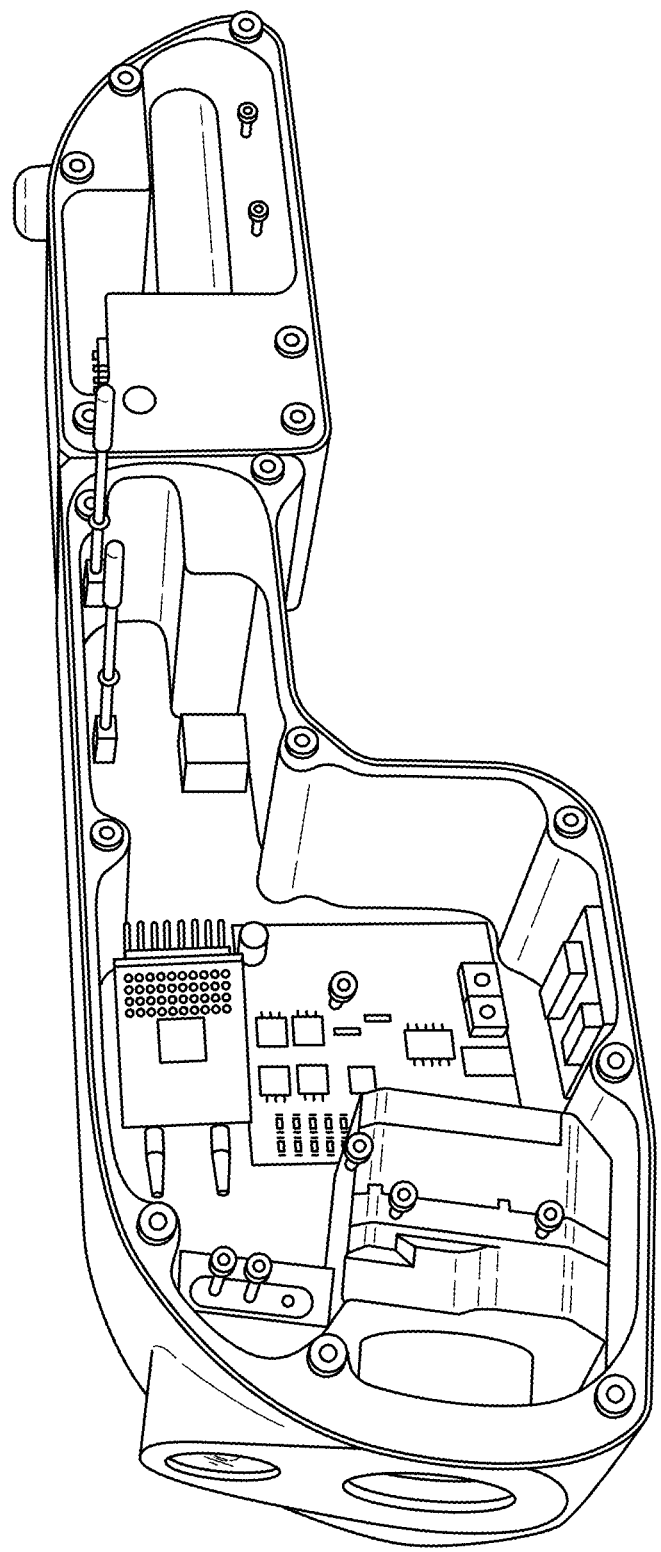
FIG. 9 is an isometric view of components mounted in a frame according to embodiments of the present disclosure.
Figure 10:
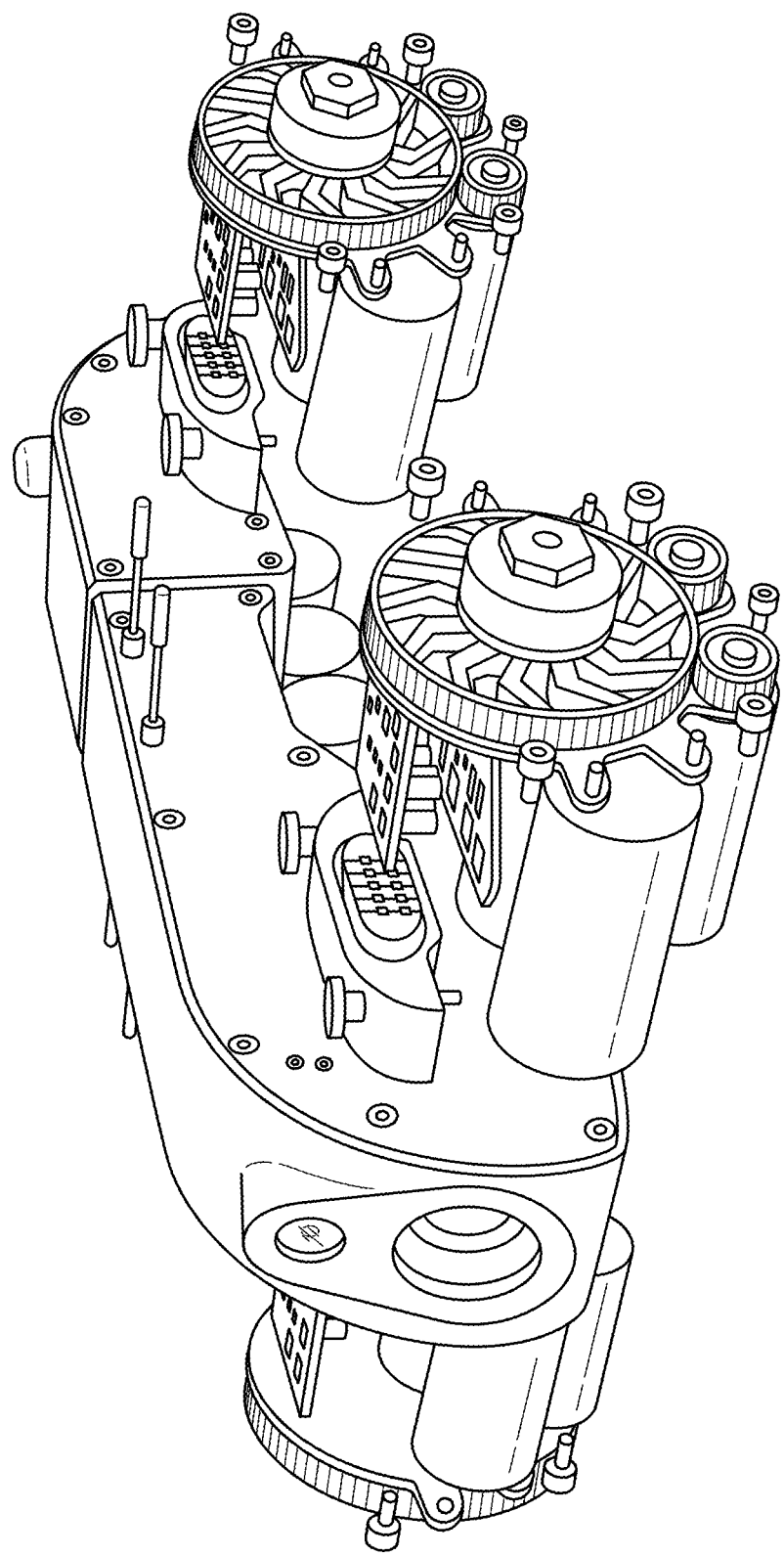
FIG. 10 is an isometric view of wheel components according to embodiments of the present disclosure.
Figure 11:
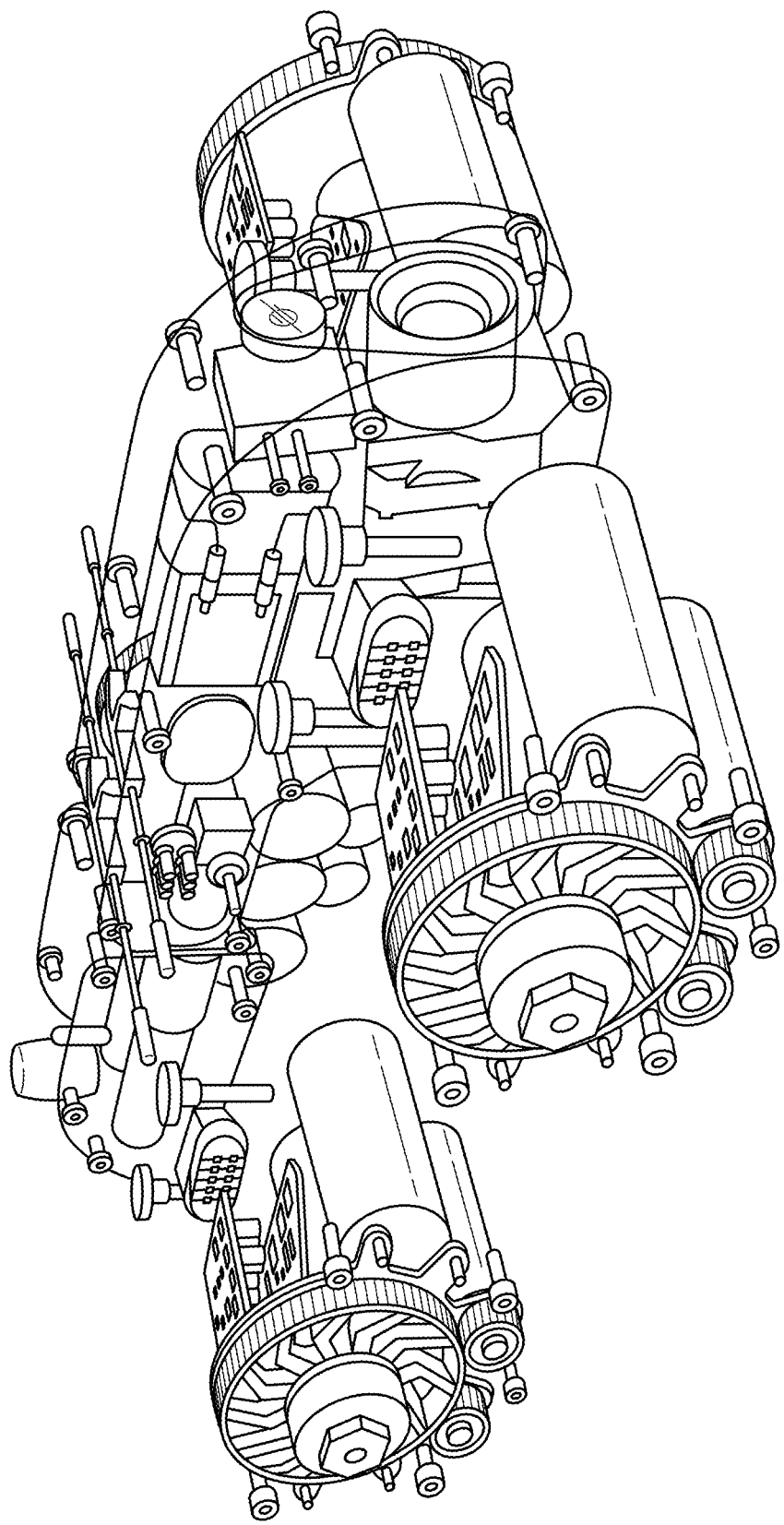
FIG. 11 is another isometric view of vehicle components according to embodiments of the present disclosure.
Figure 12:
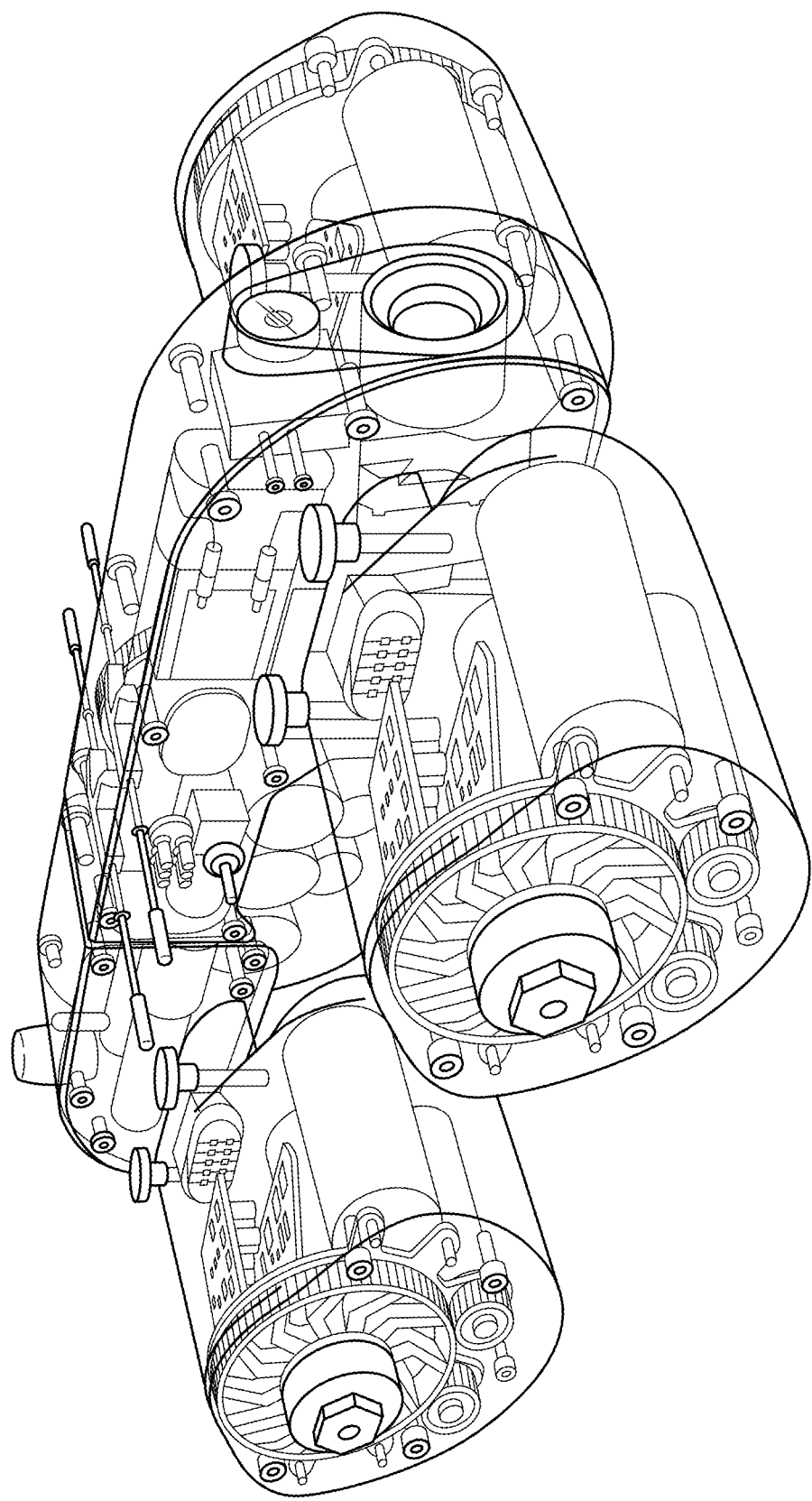
FIG. 12 is yet another isometric view of vehicle components according to embodiments of the present disclosure.
Figure 13:
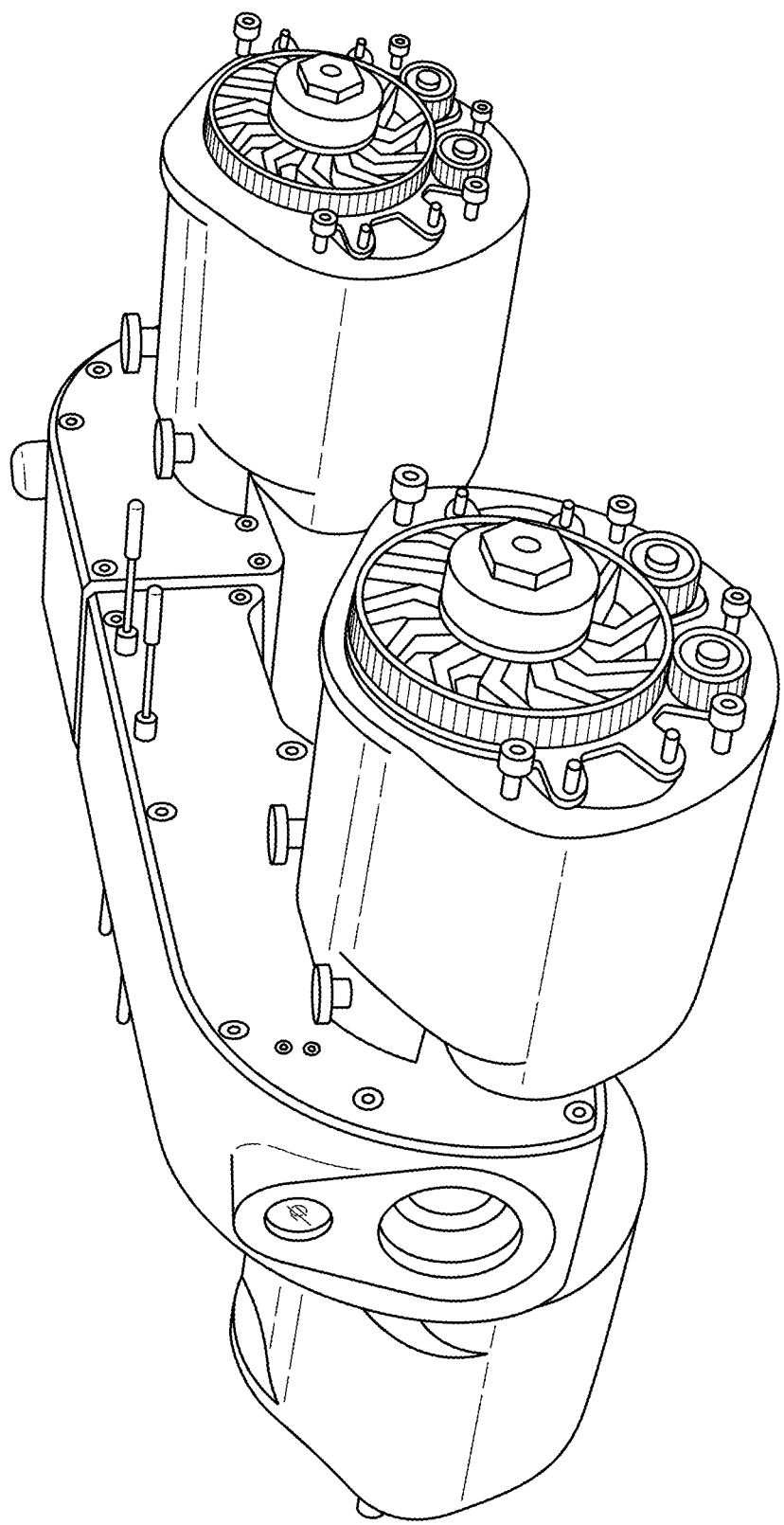
FIG. 13 is another isometric view of vehicle components according to embodiments of the present disclosure.

FIGS. 9 and 10 illustrate additional details of components that may be included in the vehicle 100. As a non-limiting example, the frame 104 may be configured to house a number of input and output devices as well as processors to process information received from inputs and to control various output devices. Illustrative devices include a thermal imager, a drive camera, a cam switch, an RF radio, a motion controller, a linear actuator (e.g., that controls an adjustable piston that can extend and contract the frame 104), etc. As previously discussed, the wheel core 304 may include one or more batteries, motors, motor controllers, gears, and the like. Some of all of the components of the wheel core 304 that have any substantial weight may be positioned below the axis of rotation of the wheel 108 that rotates around the wheel core 304.

Referring now to FIGS. 17-21, another illustrative wheel 108 will be described in accordance with at least some embodiments of the present disclosure. The wheel 108 is shown to include a wheel core 2000 around which a tire rotates. The wheel core 2000 may include a physical mount 1804, a motor 1808, and a battery/control unit 1812. The physical mount 1804 may be provided as a metal plate or the like that is configured to be physically attached to a vehicle frame. The motor 1808 may be configured to impart a rotational motion on the tire whereas the physical mount 1804 may be fixedly attached to the vehicle frame. In some embodiments, the physical mount 1804 does not move relative to the vehicle frame after attachment thereto whereas the tire is allowed to rotate.

As with other wheel cores depicted and described herein, the wheel core 2000 may be configured to have a center of mass that is positioned below the axis of rotation. The center of mass of the wheel core 2000 may be lowered relative to the axis of rotation by positioning the weight-bearing components of the wheel core 2000 (e.g., the physical mount 1804, the motor 1808, and the battery/control unit 1812) below the axis of rotation.

The wheel 108 is also shown to include a suspension 2104, which may be connected between the physical mount 1804 and the vehicle frame. The suspension 2104 may be configured to absorb at least some relative motion between the wheel 108 and vehicle frame, thereby stabilizing the ride for a passenger or cargo of the vehicle.

Figure 22:
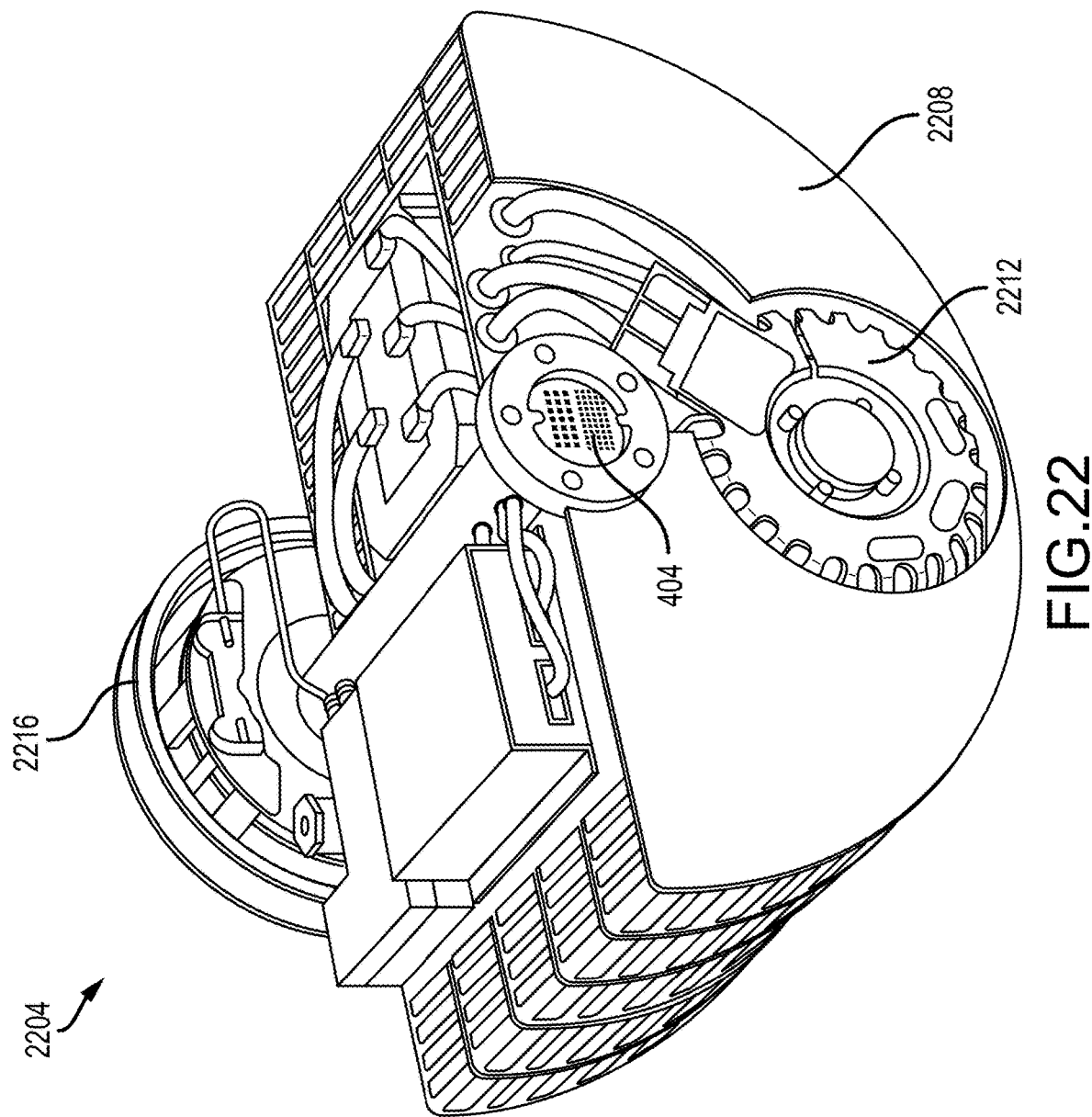
FIG. 22 is an isometric view of another wheel core according to embodiments of the present disclosure.
Figure 23A:
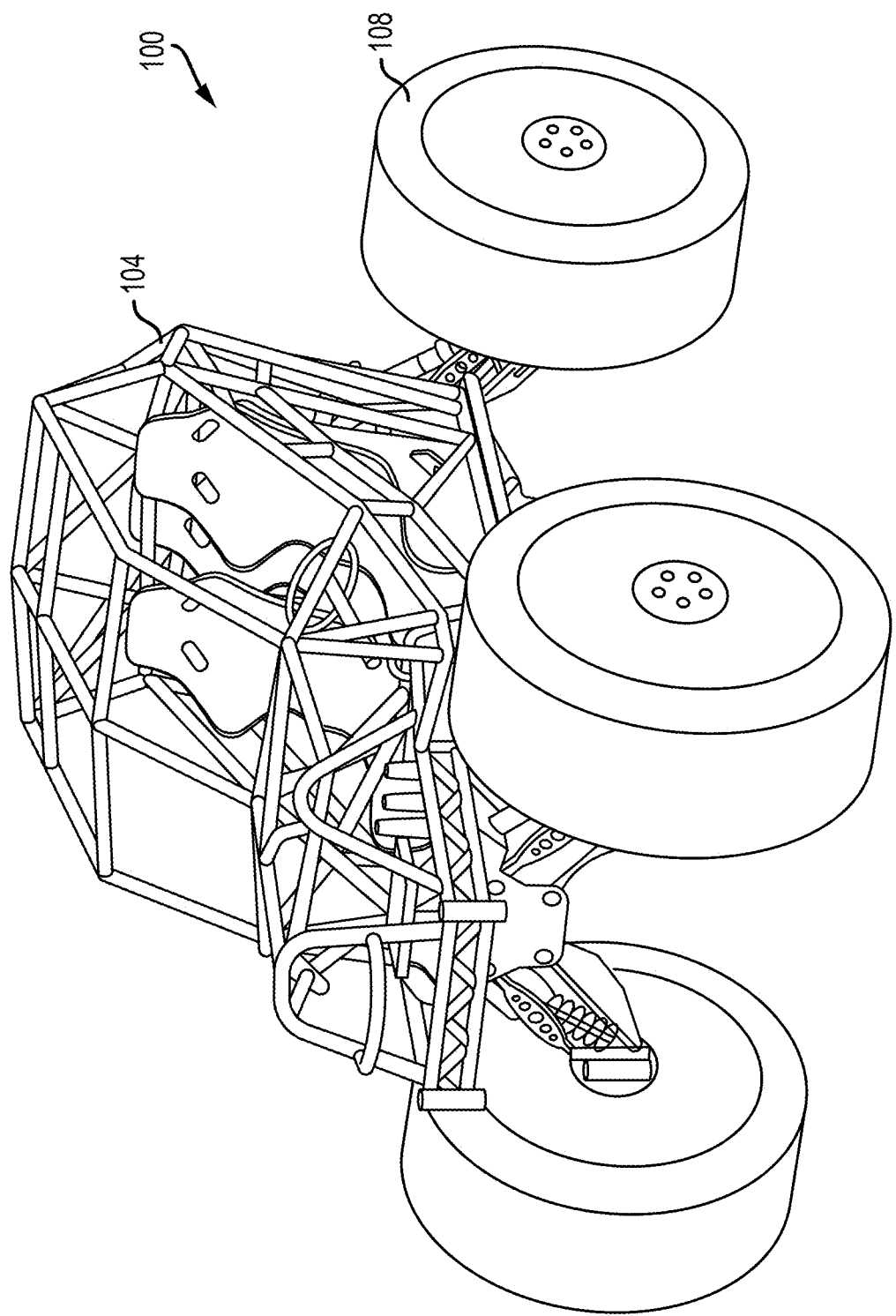
FIG. 23A depicts another vehicle according to embodiments of the present disclosure.
Figure 23B:
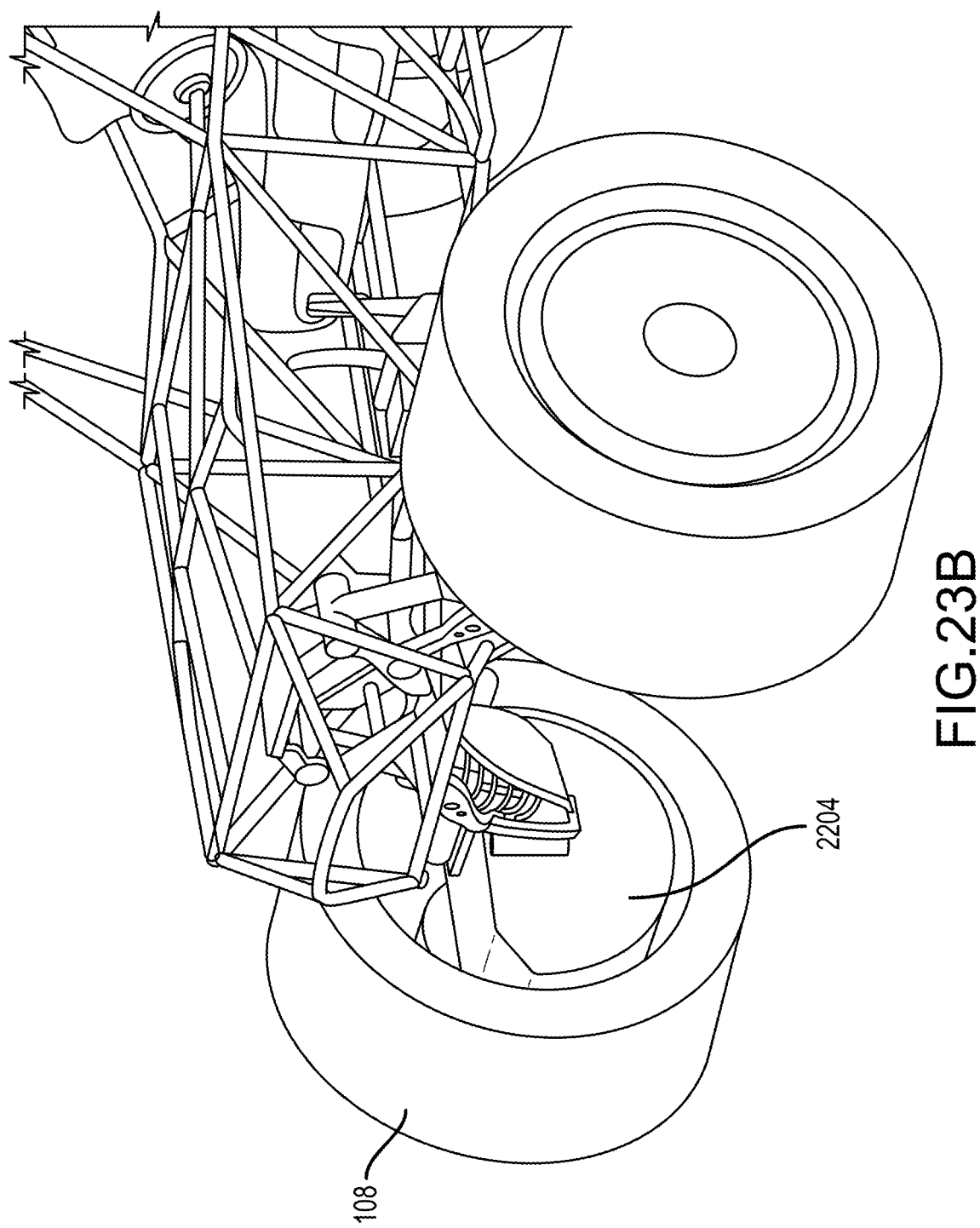
FIG. 23B depicts further details of the vehicle shown in FIG. 23A.
Figure 23C:
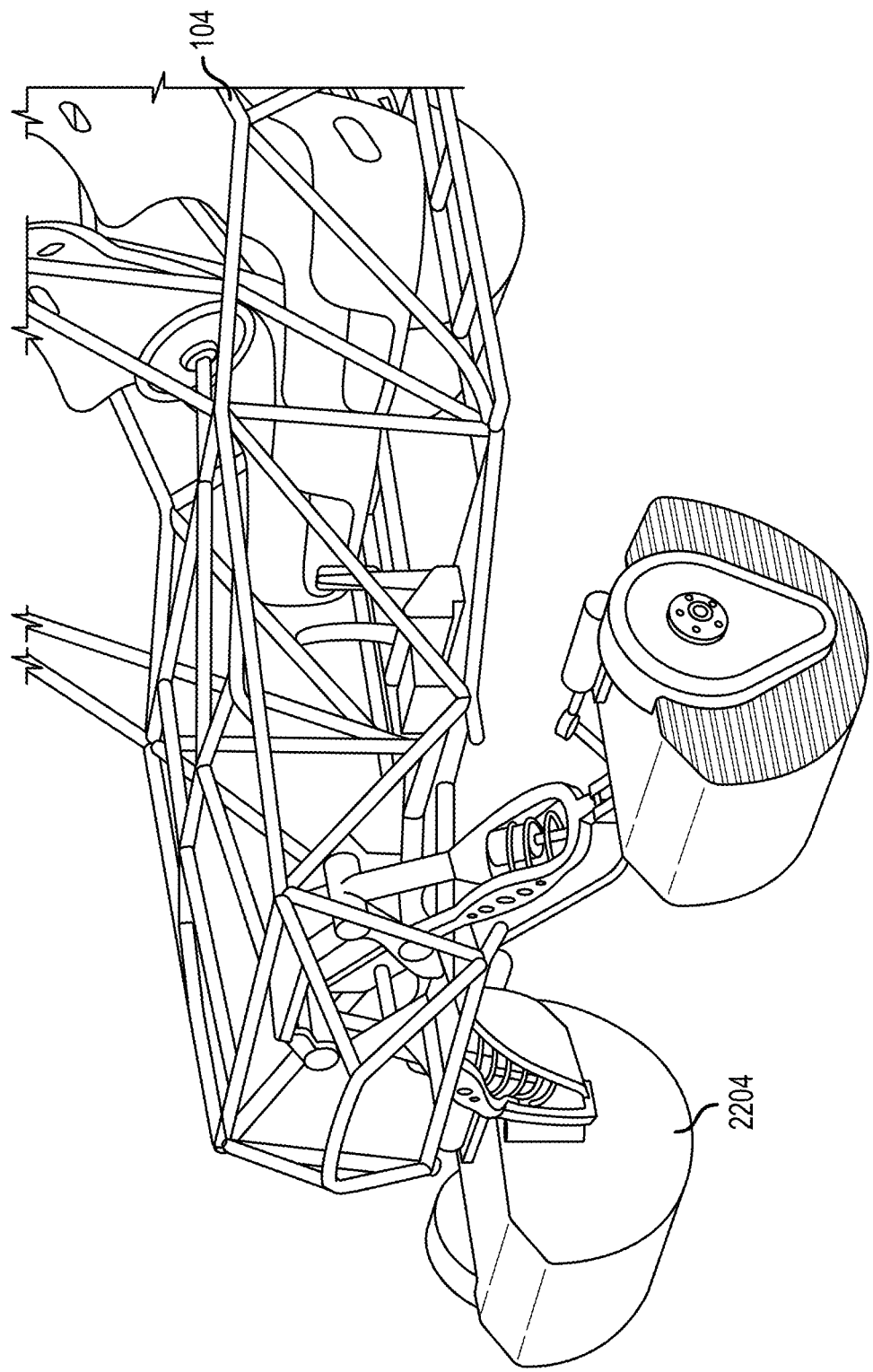
FIG. 23C depicts further details of the vehicle shown in FIG. 23A.
Figure 24:
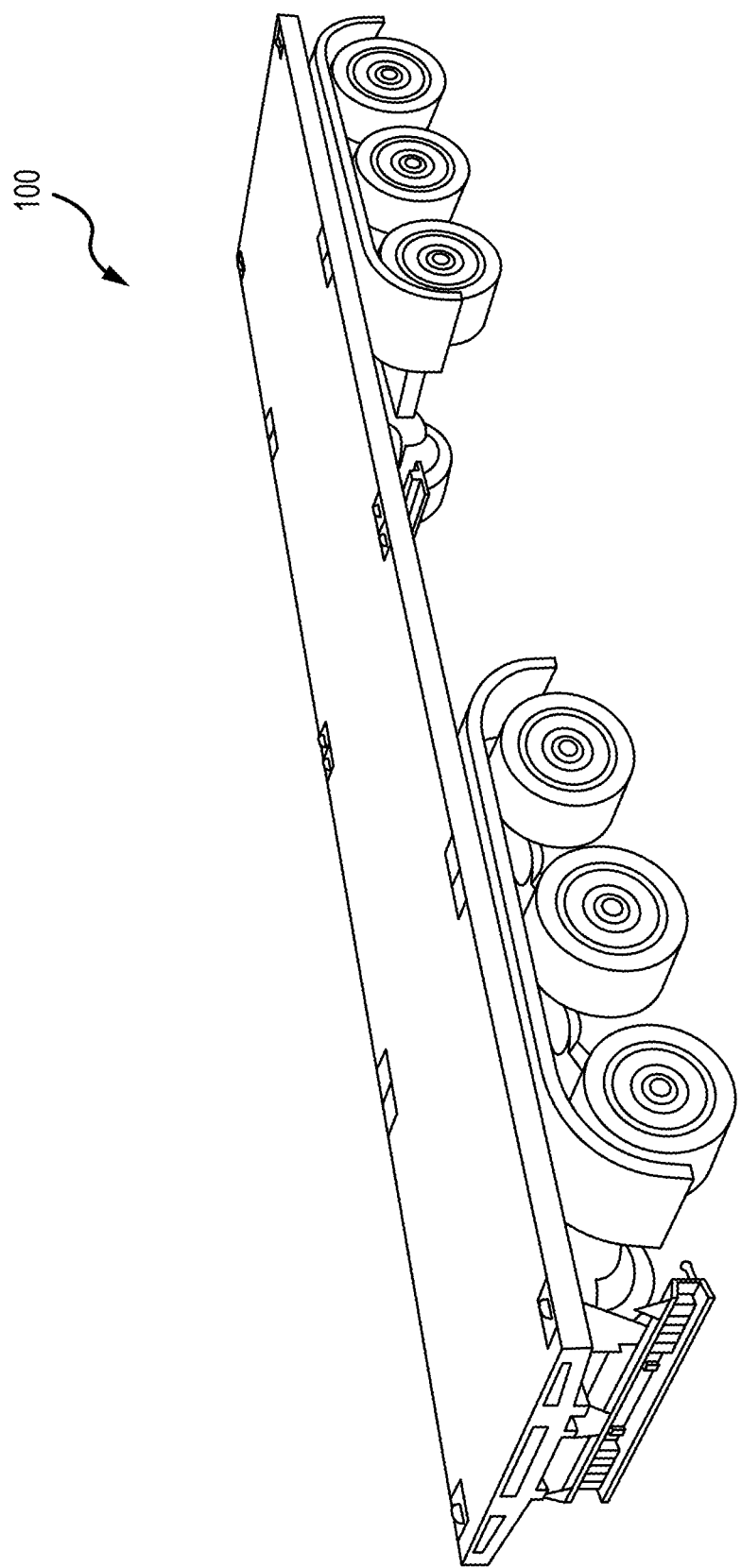
FIG. 24 is an isometric view of another vehicle according to embodiments of the present disclosure.

FIGS. 22-24 illustrate yet another example of a wheel core 2204 for use in a wheel 108. The wheel core 2204 may be used in connection with any type of wheel and/or any type of vehicle. The wheel core 2204 is shown to include a cooling unit 2208, a motor 2212, and a physical mount 2216. The center of mass of the cooling unit 2208, motor 2212, and any other components of the wheel core 2204 (e.g., power supplies, batteries, controllers, etc.) may be provided below the center of mass of the wheel core 2204. The physical mount 2216 may be used to physically connect or mount the wheel core 2204 to a vehicle frame. The wheel core 2204 may not rotate relative to the vehicle frame 104, but operation of the motor 2212 may cause the wheel 108 itself to rotate around the wheel core 2204, thereby providing driving propulsion for the vehicle.

Various vehicle configurations illustrate a four-wheel embodiment of the present disclosure. It should be appreciated that a vehicle may be configured to support any number of wheels (e.g., 2, 3, 4, 5, . . . , 10, etc.) without departing from the scope of the present disclosure.

Specific details were given in the description to provide a thorough understanding of the embodiments. However, it will be understood by one of ordinary skill in the art that the embodiments may be practiced without these specific details. Additionally, the Figures do not depict well-known features that may be needed to create a working vehicle so as not to obscure the embodiments in unnecessary detail.

What is claimed is:

1. A wheel for use with a vehicle, the wheel comprising:
   a wheel core configured to be physically mounted to the vehicle, wherein the wheel core comprises:
   a rotation point that establishes an axis of rotation for the wheel;
   a core body having a center of mass positioned below the axis of rotation;
   a motor that, in response to control signals, causes the wheel to rotate about the axis of rotation and to rotate about the wheel core,
   a cavity provided in the core body that is configured to receive the motor and position the motor below the axis of rotation;
   a battery provided in the cavity of the wheel core, wherein the battery provides power to the motor and wherein the battery is positioned below the axis of rotation;
   an access panel that is removably attachable to the core body and that provides access to the cavity when removed from the core body.

2. The wheel of claim 1, further comprising:
   a physical mount that fixedly attaches the wheel core to the frame and that prohibits motion of the wheel core relative to the frame while the wheel core is attached thereto.

3. The wheel of claim 1, wherein the access panel seals the cavity when attached to the core body.

4. The wheel of claim 1, wherein the motor is integrated into the access panel such that removal of the access panel from the wheel core causes the motor to be removed from the cavity.

5. The wheel of claim 1, wherein the access panel comprises one or more gears that couple the motor with a hub and wherein the hub coincides with the rotation point.

6. The wheel of claim 1, further comprising:
   a motor controller provided in the cavity of the wheel core.

7. The wheel of claim 6, wherein the wheel core further comprises an electrical interface that provides communication capabilities between a component mounted in a frame of the vehicle and the motor controller.

8. The wheel of claim 7, wherein the electrical interface comprises a wired electrical interface that carries control signals between the component mounted in the frame of the vehicle and the motor controller.

9. The wheel of claim 1, wherein the wheel core further comprises an antenna to facilitate wireless communications between the motor controller and another control device.

10. The wheel of claim 1, wherein the wheel core comprises molded plastic.

11. A vehicle comprising the wheel of claim 1.

12. A wheel for use with a vehicle, the wheel comprising:
    a wheel core configured to be physically mounted to the vehicle, wherein the wheel core comprises:
    a rotation point that establishes an axis of rotation for the wheel;
    a core body;
    a motor that, in response to control signals, causes the wheel to rotate about the axis of rotation and to rotate about the wheel core;
    a battery that provides power to the motor;
    a cavity that is configured to receive the motor and battery; and
    an electrical interface that provides an electrical connection between a component mounted in a frame of the vehicle and a component mounted in the wheel core.

13. The wheel of claim 12, further comprising:
    a motor controller provided in the cavity of the wheel core, wherein the motor controller receives electrical control signals via the electrical interface.

14. The wheel of claim 12, wherein the wheel core further comprises an access panel that is removably attachable to the core body and that provides access to the cavity when removed from the core body.

15. The wheel of claim 14, wherein the access panel seals the cavity when attached to the core body.

16. The wheel of claim 14, wherein the motor is integrated into the access panel such that removal of the access panel from the wheel core causes the motor to be removed from the cavity.

17. The wheel of claim 14, wherein the access panel comprises one or more gears that couple the motor with a hub and wherein the hub coincides with the rotation point.

18. The wheel of claim 12, wherein the battery and motor are positioned below the axis of rotation.

19. The wheel of claim 12, wherein the battery is positioned below the axis of rotation.

20. The wheel of claim 12, wherein the motor is positioned below the axis of rotation.

* * * * *